(12) United States Patent
Renner et al.

(10) Patent No.: US 7,567,662 B1
(45) Date of Patent: Jul. 28, 2009

(54) CONFERENCE CALLS VIA ELECTRONIC MESSAGING INTERFACE

(75) Inventors: W. Karl Renner, Great Falls, VA (US); Stephen Vaughan Murphy, Ashburn, VA (US)

(73) Assignee: AOL LLC, Dulles, VA (US)

(*) Notice: Subject to any disclaimer, the term of this patent is extended or adjusted under 35 U.S.C. 154(b) by 993 days.

(21) Appl. No.: 11/023,635

(22) Filed: Dec. 29, 2004

Related U.S. Application Data

(60) Provisional application No. 60/631,888, filed on Dec. 1, 2004.

(51) Int. Cl.
H04M 3/42 (2006.01)

(52) U.S. Cl. .................. 379/202.01; 379/215.01

(58) Field of Classification Search ............ 379/202.01, 379/215.01
See application file for complete search history.

(56) References Cited

U.S. PATENT DOCUMENTS

| | | | |
|---|---|---|---|
| 5,243,645 A | 9/1993 | Bissell et al. | |
| 5,329,578 A | 7/1994 | Brennan et al. | |
| 5,375,161 A | 12/1994 | Fuller et al. | |
| 5,408,526 A | 4/1995 | McFarland et al. | |
| 5,422,942 A | 6/1995 | Kakwashima | |
| 5,537,467 A | 7/1996 | Cheng et al. | |
| 5,548,636 A | 8/1996 | Bannister et al. | |
| 5,557,659 A | 9/1996 | Hyde-Thomson | |
| 5,625,676 A | 4/1997 | Greco et al. | |
| 5,631,904 A | 5/1997 | Fitser et al. | |
| 5,651,054 A | 7/1997 | Dunn et al. | |
| 5,668,862 A | 9/1997 | Bannister et al. | |
| 5,703,943 A | 12/1997 | Otto | |
| 5,805,587 A | 9/1998 | Norris et al. | |
| 5,809,128 A | 9/1998 | McMullin | |
| 5,812,653 A | 9/1998 | Jodoin et al. | |
| 5,841,966 A | 11/1998 | Irribarren | |
| 5,848,134 A | 12/1998 | Sekiguchi et al. | |
| 5,894,504 A | 4/1999 | Alfred et al. | |
| 5,937,051 A | 8/1999 | Hurd et al. | |

(Continued)

FOREIGN PATENT DOCUMENTS

EP 0 959 593 11/1999

(Continued)

OTHER PUBLICATIONS

International Search Report, Application No. PCT/US04/23383, dated Mar. 28, 2005.

(Continued)

Primary Examiner—Creighton Smith
(74) Attorney, Agent, or Firm—Fish & Richardson P.C.

(57) ABSTRACT

Initiating a conference call includes identifying a group of users, determining the availability of users within the identified group to receive an electronic conference call invitation, and sending an electronic conference call invitation to at least two users within the identified group based on their determined availability. The users who are sent the electronic conference call invitation are able to respond to the electronic conference call invitation. The users who are sent the electronic conference call invitation and respond with an indication of availability for participation in the conference call are determined. A conference call is initiated between users who are sent the electronic conference call invitation based on whether the users respond with an indication of availability.

66 Claims, 19 Drawing Sheets

U.S. PATENT DOCUMENTS

| | | | |
|---|---|---|---|
| 6,038,293 | A | 3/2000 | McNerney et al. |
| 6,144,644 | A | 11/2000 | Bajzath et al. |
| 6,215,857 | B1 | 4/2001 | Kasiviswanathan |
| 6,282,275 | B1 | 8/2001 | Gurbani et al. |
| 6,295,341 | B1 | 9/2001 | Muller |
| 6,301,609 | B1 | 10/2001 | Aravamudan et al. |
| 6,311,231 | B1 | 10/2001 | Bateman et al. |
| 6,353,660 | B1 | 3/2002 | Burger |
| 6,356,633 | B1 | 3/2002 | Armstrong |
| 6,363,258 | B1 * | 3/2002 | Schmidt et al. ............ 455/514 |
| 6,366,661 | B1 | 4/2002 | Devillier et al. |
| 6,373,836 | B1 | 4/2002 | Deryugin et al. |
| 6,377,668 | B1 | 4/2002 | Smock et al. |
| 6,389,007 | B1 | 5/2002 | Shenkman et al. |
| 6,396,908 | B1 | 5/2002 | O'Donovan et al. |
| 6,404,747 | B1 | 6/2002 | Berry et al. |
| 6,421,425 | B1 | 7/2002 | Bossi et al. |
| 6,453,164 | B1 | 9/2002 | Fuller et al. |
| 6,463,038 | B1 | 10/2002 | Wilson |
| 6,463,145 | B1 | 10/2002 | O'Neal et al. |
| 6,477,246 | B1 | 11/2002 | Dolan et al. |
| 6,496,501 | B1 | 12/2002 | Rochkind et al. |
| 6,498,841 | B2 | 12/2002 | Bull et al. |
| 6,518,994 | B1 | 2/2003 | Johnson et al. |
| 6,529,587 | B1 | 3/2003 | Cannon et al. |
| 6,532,286 | B1 | 3/2003 | Burg |
| 6,567,854 | B1 | 5/2003 | Olshansky et al. |
| 6,574,599 | B1 | 6/2003 | Lim et al. |
| 6,577,622 | B1 | 6/2003 | Schuster et al. |
| 6,587,555 | B1 | 7/2003 | Cripe et al. |
| 6,631,399 | B1 | 10/2003 | Stanczak et al. |
| 6,671,365 | B2 | 12/2003 | Kemppainen |
| 6,724,867 | B1 | 4/2004 | Henderson |
| 6,738,461 | B2 | 5/2004 | Trandal et al. |
| 6,757,274 | B1 | 6/2004 | Bedingfield et al. |
| 6,775,378 | B1 | 8/2004 | Villena et al. |
| 6,876,632 | B1 | 4/2005 | Takeda |
| 6,999,577 | B2 | 2/2006 | Wang et al. |
| 7,076,041 | B2 | 7/2006 | Brown et al. |
| 2002/0075304 | A1 * | 6/2002 | Thompson et al. ......... 345/751 |
| 2003/0086432 | A1 | 5/2003 | Bartfeld et al. |
| 2003/0112931 | A1 | 6/2003 | Brown et al. |
| 2003/0112952 | A1 | 6/2003 | Brown et al. |
| 2003/0133558 | A1 | 7/2003 | Kung et al. |
| 2003/0215078 | A1 | 11/2003 | Brahm et al. |
| 2003/0236820 | A1 | 12/2003 | Tierney et al. |
| 2004/0091089 | A1 * | 5/2004 | Wynn ..................... 379/93.05 |
| 2004/0141594 | A1 | 7/2004 | Brunson et al. |
| 2004/0141596 | A1 | 7/2004 | Crockett et al. |
| 2004/0170266 | A1 * | 9/2004 | Adams et al. .......... 379/202.01 |
| 2005/0074107 | A1 * | 4/2005 | Renner et al. .......... 379/202.01 |
| 2006/0080432 | A1 * | 4/2006 | Spataro et al. .............. 709/224 |
| 2006/0088152 | A1 * | 4/2006 | Green et al. ........... 379/202.01 |

FOREIGN PATENT DOCUMENTS

| | | |
|---|---|---|
| EP | 1 120 954 | 8/2001 |
| EP | 1 148 756 | 10/2001 |
| EP | 1 298 900 | 4/2003 |
| EP | 1 309 164 | 5/2003 |
| JP | 08 314 826 | 11/1996 |
| WO | 99/23807 | 5/1999 |
| WO | WO 00/60809 | 10/2000 |
| WO | 01/76210 | 10/2001 |
| WO | 02/25907 | 3/2002 |
| WO | 02/078368 | 10/2002 |

OTHER PUBLICATIONS

International Search Report, Application No. PCT/US04/32435, dated Apr. 7, 2005.
Office Action, U.S. Appl. No. 10/747,256, dated Mar. 25, 2005.
International Search Report, Application No. PCT/US2004/018785, dated Oct. 27, 2004.
Written Opinion of Application Serial No. PCT/US2004/018785, dated Oct. 27, 2004.
International Search Report and Written Opinion of the International Searching Authority, International Application No. PCT/US04/32562, dated Apr. 12, 2005.
Rick James: "Finally! Interactive 'Call Waiting' While You're Surfing?", Internet Document, [Online], pp. 1-4, Retrieved from the Internet: www.monitor.ca/monitor/issues/vol4iss12/feature7.html, [retrieved on Sep. 2, 2004].
Anonymous: "Does the Internet Have Call Waiting?", Internet Document, [Online] Copyright 2002, Tech TV, Inc., pp. 1-2, Retrieved from the Internet: www.techtv.com/screensavers/print/0,23102,2256423,00.html, [retrieved on Oct. 2, 2002].
Anonymous: "Did Someone Just Call You?", Internet Document, [Online] Copyright 2002, CallWave, Inc., p. 1, Retrieved from the Internet: www.callwave.com, [retrieved on Oct. 2, 2002].
Anonymous: "Internet Answering Machine™ Software", Internet Document, [Online] Copyright 2002, CallWave, Inc. pp. 1-2, [Retrieved from the Internet: www.callwave.com/findoutmore.asp?ct=hpl_fom, Oct. 2, 2002].

* cited by examiner

1200

Conference Call Invitation

You have received a call invitation

Bob De
(703) 12(
Dulles
5:45 EDT -

The topic of the
"Review Parodi

This conference
The Ultrasound
and is expected
What would yo

○ Join the conference call a

○ Join the conference call as a lis

○ Do not join the conference c

☒ Send a message to other potential call participants

☒ Join conference call over telephone

☐ Join conference call over Internet

Conference Call Status

| Invitee | Status? |
|---|---|
| MarKUS5 | active |
| devoPar | active |
| SomSorpentor | inactive |
| DoorStyp | ? |
| ArguSB | |
| BOTSm | |
| FuRoR | |

Conference Call Invitee Chat

MarKUS5: Want to talk about third milestone.

devoPar: John is with me and will join the call

SomSorpentor: Can't make it, have customer call at 6pm.

BobDevane123: Let's try to wrap this up in 30 minutes.

SomSorpentor: Hey FuRoR, make sure you talk about that Mudflation issue.

| Online Call Invitees |
|---|
| DoorStyp |
| MarKUS5 |
| devoPar |
| SomSorpentor |
| BOTSmember |
| ArguSBill6 |
| FuRoRPlaneD |
| CALL Initiator- BobDevane123 |

Fig. 12

CONFERENCE CALLS VIA ELECTRONIC MESSAGING INTERFACE

CROSS REFERENCE TO RELATED APPLICATION

This application claims priority to and incorporates by reference U.S. Provisional Patent Application No. 60/631,888, filed Dec. 1, 2004, and titled CONFERENCE CALLS VIA AN IM INTERFACE. This application incorporates by reference U.S. patent application Ser. No. 10/414,167, filed Apr. 15, 2003, and titled COMMUNICATION DEVICE MONITORING, U.S. patent application Ser. No. 10/674,797, filed Oct. 1, 2003, and titled MULTI-USER CALL WAITING, and U.S. patent application Ser. No. 10/320,712, filed Dec. 17, 2002, and titled CASCADED DELIVERY OF AN ELECTRONIC COMMUNICATION.

TECHNICAL FIELD

This document relates to a conference call system that enables a caller to send conference call invitations to multiple online users and initiate a conference call with invited online users in accordance with their responses to the conference call invitations.

BACKGROUND

Several techniques are known for establishing conference calls between three or more parties. For example, a host may call each party to the conference and individually bridge each called party onto the conference call. Alternatively, a "dial-in" telephone number with associated access code may be used to join all parties at a common bridge. Each party dials into the bridge, eliminating the need for the host to call each party individually. In yet another technique, a host calls a central number and specifies the participants to the conference call. The network then places outbound calls to each of the specified participants, and the participants join the conference call by answering the outbound calls.

SUMMARY

In one general aspect, initiating a conference call includes identifying a group of users, determining the availability of users within the identified group to receive an electronic conference call invitation, and sending an electronic conference call invitation to at least two users within the identified group based on their determined availability. The users who are sent the electronic conference call invitation are able to respond to the electronic conference call invitation. The users who are sent the electronic conference call invitation and respond with an indication of availability for participation in the conference call are determined. A conference call is initiated between users who are sent the electronic conference call invitation based on whether the users respond with an indication of availability.

Implementations may include one or more of the following features. For example, identifying a group of users may include identifying a group of users based on a telephone call received from a caller and wherein initiating a conference call between users comprises initiating a conference call between the users and the caller. Identifying a group of users based on the call may include identifying the group of users based on the telephone number called by the caller.

Identifying a group of users may include identifying the group of users by enabling the initiating user to specify the group of users. Enabling the initiating user to specify the group of users may include enabling the initiating user to choose a group of users from a plurality of predetermined groups. The plurality of predetermined groups may be personalized to the initiating user.

Identifying a group of users may include identifying a group of users that share a common interest, trait, or characteristic. Identifying a group of users may include receiving a telephone call from a caller and enabling the caller to specify the users in the group. Identifying a group of users may include presenting identifiers for candidate users verbally to the caller and accepting identification of selected candidate users by the caller. Identifying a group of users may include accepting identification of selected candidate users by an initiating user that selected the candidate users based on user attributes.

Determining the availability of users to receive an electronic conference call invitation may include accessing the online status of user identifiers corresponding to each user from an online service provider system. The conference call may be setup using voice-over-IP such that initiating the conference call may include initiating a voice-over-IP conference call.

Sending an electronic conference call invitation to at least two users may include sending a separate electronic conference call invitation to each of the at least two users. Sending an electronic conference call invitation to each of the at least two users may include sending electronic conference call invitations addressed to user identifiers corresponding to the at least two users to an online service provider system for delivery to the at least two users. The electronic conference call invitations may be e-mails or instant messages.

Enabling the users to respond to the electronic conference call invitation may include enabling the users to select from among one or more options personalized to each user. Enabling the users to respond to the electronic conference call may include enabling the users to select from among one or more call participation options. The call participation options may include an option selectable to actively participate in the conference call, an option selectable to allow the user to listen but not speak when participating in the conference call, or an option selectable to not participate in the conference call. The call participation options may include an option to send a message to each of the other users that received an electronic conference call invitation. The message may include a text message and/or an audio message. The call participation options may include an option selectable to record the conference call. The option to record the conference call is selectable to record the conference call and to send the recording to the user using e-mail.

Each of the users who are sent the electronic conference call invitation may perceive the call participation options selected by the other users who are sent the electronic conference call invitation. Enabling each of the users who are sent an electronic conference call invitation to perceive the call participation options selected by the other users may include enabling each of the users who are sent the electronic conference call invitation to perceive the call participation options selected by the other users in a visual display.

A user that initiates the conference call may perceive the call participation options selected by the users who are sent the electronic conference call invitation. The users that initiate the conference call may cancel the conference call based on the perceived call participation options selected by the users who are sent the electronic conference call invitation.

Enabling the users to respond to the electronic conference call invitation may include enabling the users to select from among one or more call connection options. The call connection options may include an option to connect to the conference call over a telephone network or over a data network. The call connection options may include an option selectable to display a telephone number that may be used to dial into the conference call.

The availability of the users to receive a conference call invitation may be determined prior to identifying the group of users. Identifying the group of users may include identifying the group of users from among the users determined to be available.

Determining the availability of users within the identified group may include determining the availability of the users to participate in the conference call using voice-over-IP In another general aspect, a user interface for enabling a user to perceive and respond to a conference call invitation includes a first interface element structured and arranged to provide notification that an electronic conference call invitation has been received from a sender and a second interface element structured and arranged to enable a recipient of the invitation to respond to the electronic conference call invitation by enabling the recipient to select from among one or more options to react to the received invitation.

Implementations may include one or more of the following features. For example, the first interface element may include a perceivable indicator reflecting sender profile information. The sender profile information may include the name of the sender, a telephone number associated with the sender, or the geographic location of the sender.

The first interface element may include a perceivable indicator reflecting a topic of discussion for the conference call, a perceivable label associated with the group of users to which conference call invitations have been sent, a perceivable indicator reflecting an identity of one or more other users to whom the conference call invitation has been extended, or a perceivable indicator reflecting an identity of all other users to whom the electronic conference call invitation has been extended.

The options may be personalized to the recipient. The options made available to a first recipient may be different than the options made available to a second recipient.

The options may include call participation options. The call participation options may include an option selectable to allow the user to listen but not speak when participating in the conference call involving the sender or an option selectable to not participate in the conference call. The option selectable to not participate in the conference call may include an option selectable to decline the conference call invitation or an option selectable to communicate electronically with the sender using a medium other than the conference call. The option to communicate with the sender may include an option to send an e-mail or instant message to the sender.

The call participation options may include an option to send a message to each of the other users that received an electronic conference call invitation from the sender. The message may include a text message or an audio message.

The call participation options may include an option selectable to record the conference call. The option to record the conference call may be selectable to record the conference call and to send the recording to the user using e-mail.

The user interface may include a third interface element structured and arranged to enable the recipient to perceive the call participation option selected by the other users that received an electronic conference call invitation form the sender.

The options may include call connection options. The call connection options may include an option to connect the conference call over a telephone network or over a data network.

DESCRIPTION OF DRAWINGS

FIG. 12 illustrates an example of a user interface presented to a user upon receipt of an updated call notification message.

DETAILED DESCRIPTION

Figure 1A:
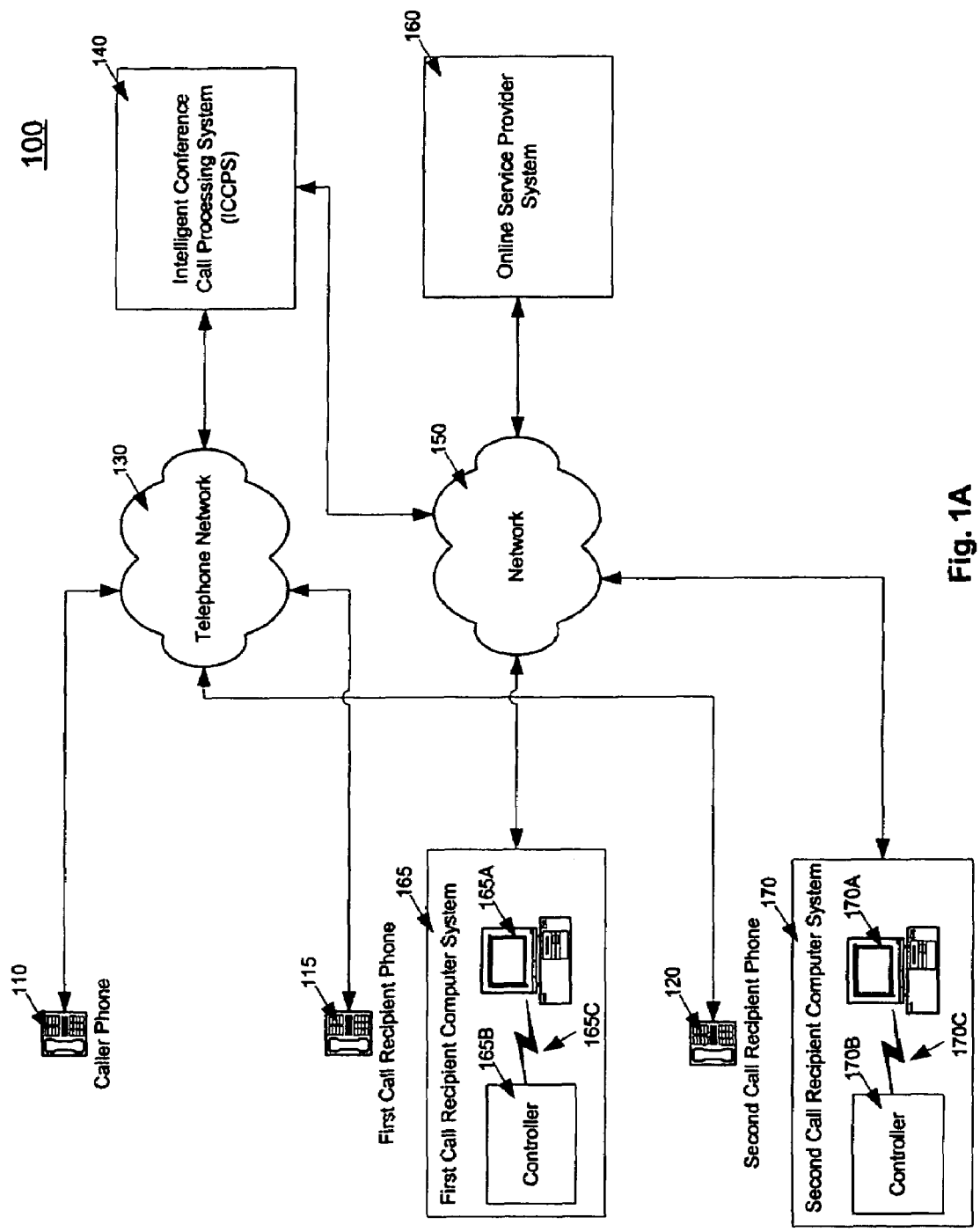
FIGS. 1A and 1B are block diagrams illustrating a communications system for initiating a conference call using an electronic messaging interface.

A communications system for initiating a conference call using an electronic messaging interface includes a caller telephone, multiple call recipient telephones and call recipient computer systems, a telephone network, an intelligent conference call processing system (ICCPS), a data network, and an online service provider system. The caller telephone is used by a caller to place a call over the telephone network to the ICCPS, which enables the caller to identify a community of interest, which includes a group of potential call recipients who share a common interest, trait, or characteristic or who are otherwise grouped together as an entity with which a caller may desire to communicate in a conference call. The ICCPS identifies the user identities associated with the members of the community of interest and requests the online presence of those user identities from the online service provider system. For instance, where user identities are user identifiers, such as, for example, screen names, an Instant Messaging system may be used to determine the online status of each.

The ICCPS sends call notification messages (i.e., electronic conference call invitations) through the online service provider system and over the data network to the call recipient computer systems. The call notification messages enable the potential call recipients to perceive the conference call request and the purpose or subject matter of the conference call. The call notification messages also enable potential call recipients to react to the request by selecting from among a set of options.

The set of options presented by the call notification message may include conference call participation options and conference call connection options. The conference call participation options are options selectable to control how a potential call recipient will participate in the conference call. The conference call participation options may include, but are not limited to, actively participating in the conference call, listening to the conference call, and not participating in the conference call. The conference call participation options may optionally enable a potential call recipient to send a message to the inviter or to the other potential call recipients such as, for example, a message indicating a reason why the recipient will not participate in the call. The reason may be conveyed textually or audibly to the inviter or to the other participants by the ICCPS. The conference call connection options are options selectable to control how a caller will connect to the ICCPS. The conference call connection options may include, but are not limited to, an option to participate in the conference call over a traditional telephone connection over the telephone network and an option to participate in the conference call over a data telephone or computer system able to establish and communicate over a bi-directional audio channel over the data network. Incident to the selection of one or both of these conference call connection options, the invitee may designate contact (e.g., telephone number) or location (e.g., device identifier for a device other than the one used to accept the invitation if they wish to participate in the conference call using another device) information for call routing purposes.

The call recipient computer systems send the option selections to the online service provider system which relays the option selections to the ICCPS. The ICCPS processes the option selections to determine which call recipients will be participants in the conference call. The ICCPS identifies direct numbers associated with the potential call recipients that desire to participate in the conference call and places outbound telephone calls to each of the direct numbers or otherwise establishes a bi-directional voice communication path with the call recipients. The ICCPS launches or initiates a conference call between the call recipients and the caller in accordance with the call participation options selected by each participant.

Referring to FIG. 1A, one implementation of a communications system for initiating a conference call using an electronic messaging interface is identified at reference numeral 100. The communications system 100 of FIG. 1A includes a caller telephone 110, a first call recipient telephone 115, a second call recipient telephone 120, a telephone network 130, an intelligent conference call processing system (ICCPS) 140, a data network 150, an online service provider system 160, a first call recipient computer system 165, and a second call recipient computer system 170. As such, FIG. 1A shows equipment that may be used by two representative call recipients, including their associated telephones 115 and 120 and computer systems 165 and 170. The communications system 100, however, may include any number of call recipients.

Figure 1B:
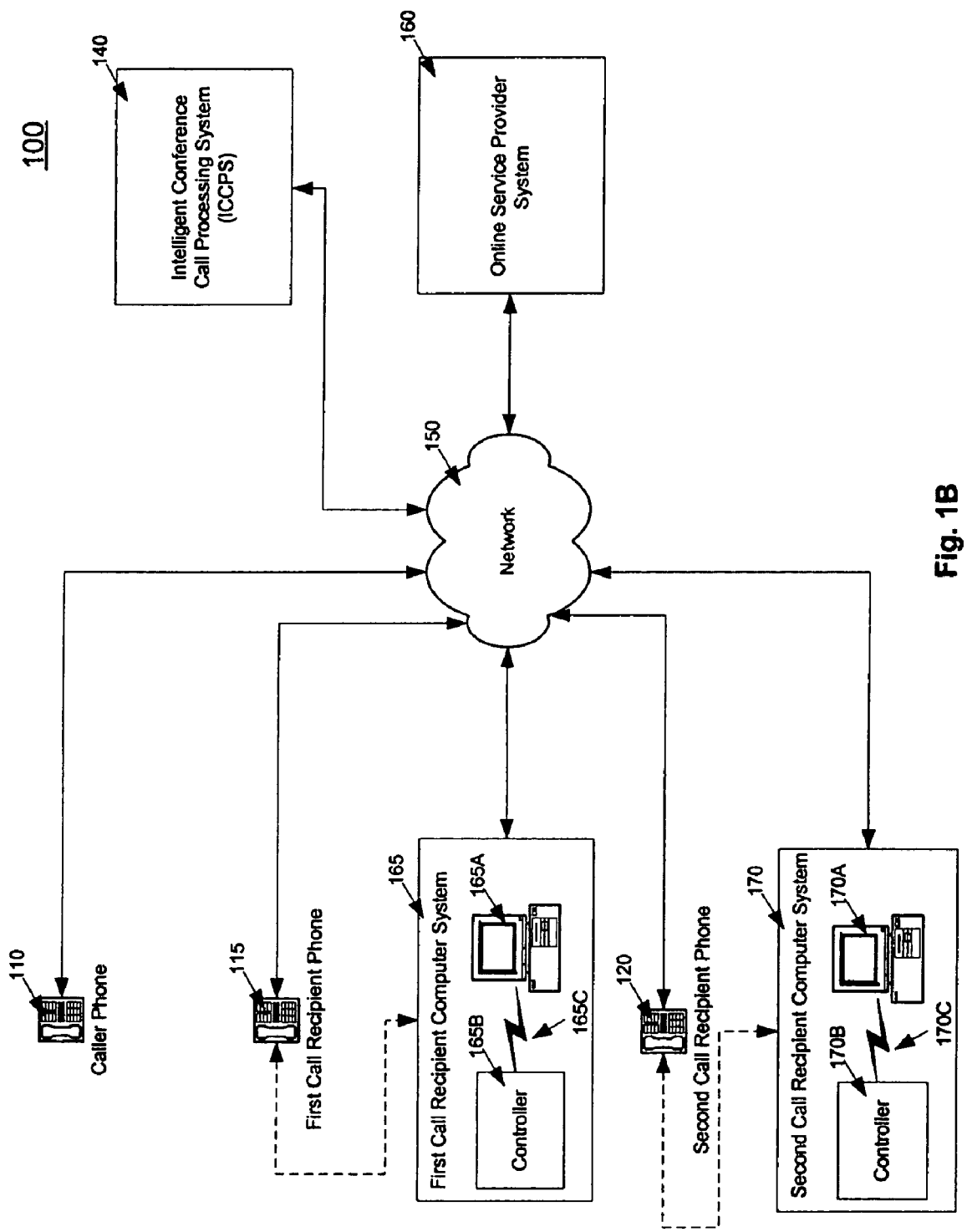

The caller telephone 110 is used by a caller to place a call to the ICCPS 140 over the telephone network 130. The caller telephone 110, the first call recipient telephone 115, and the second call recipient telephone 120 may be landline telephones that allow communications over the telephone network 130. In another implementation, any one or more of the call recipient telephones 115, 120 and the caller telephone 110 may be a cellular telephone or a mobile personal digital assistant (PDA) with embedded cellular telephone technology. In yet another implementation, the call recipient telephones 115, 120 and the call recipient computer systems 165, 170 are respectively integrated into single computer systems capable of receiving calls over the telephone network 130 and receiving data over the data network 150. As shown in FIG. 1B, any one or more of the call recipient telephones 115, 120, and the caller telephone 110 may be data devices that communicate with the ICCPS 140 over the network 150 using a voice communications protocol such as, for example, voice-over-IP.

The telephone network 130 is configured to enable direct or indirect voice communications between the caller telephone 110, the call recipient telephones 115, 120, and the ICCPS 140. When a call is placed by the caller telephone 110 to the ICCPS 140, the telephone network 130 is configured to send call-related information to the ICCPS 140 over a signaling channel. The call-related information includes call origin and call destination information. The call origin information may include the direct number of the caller telephone 110 and the time and date when the call was initiated. The call destination information may include the direct number of the ICCPS 140, which, in some implementations, is associated with a specific community of interest. The call origin information may be delivered, for example, through a service known as Automatic Number Identification (ANI), and the call destination information may be delivered, for example, through a service known as Dialed Number Identification Service (DNIS).

The telephone network 130 may be of any type including, for example, the public switched telephone network (PSTN), international networks or a combination of networks. For example, the telephone network 130 may include the AT&T interexchange (IXC) network and/or central offices of local exchange carriers (LECs). The telephone network 130 is typically circuit-switched.

The ICCPS 140 is a computer system configured to receive calls from the caller telephone 110 and enable the caller to identify a community of interest. Once a community of interest is identified, the ICCPS 140 is configured to send call notification messages to potential call recipients in the community of interest that are online or otherwise available to receive call notification messages and initiate a conference call between the caller and those potential call recipients that are interested in participating in the conference call.

A community of interest is a group of potential call recipients that share a common interest, trait, or characteristic or are otherwise grouped together as an entity with which a caller may desire to communicate in a conference call. For example, the community of interest may be a community consisting of members of a club (e.g., hunting club, skiing club, and reading club), members of an organization (e.g., National Rifle Association members in Washtenaw County, church members, and Ford employees), individuals with a common goal or cause (e.g., supporters of a presidential candidate, pro-life activists, and coworkers working on a cost-cutting initiative), individuals with a common characteristic (e.g., recovering drug addicts, individuals suffering from breast cancer, Boston Red Sox Fans, supervisors in an organization, students in Mr. Krupka's physics class, and managing partners in a law firm), or members that are grouped together for any other arbitrary reason (e.g., on the caller's buddy list).

A community of interest may be defined globally for all callers and/or may be tailored or personalized to a specific caller. For example, the caller may define one or more personalized communities of interest during service registration. Examples of caller-defined communities of interest include a community consisting of the caller's family, a community consisting of the caller's coworkers, a community consisting of the caller's friends, and a community consisting of the members of a personal contact list of the caller and/or the caller's Instant Messaging buddy list or some subgroup thereof (e.g., a buddy or contact group). Callers or other individuals also may subscribe to different globally defined communities of interest during service registration (e.g., weekly poetry reading and discussion, daily seminar, and advanced calculus course).

If a conference call is already in progress for the community of interest specified by the caller when the caller calls in, the caller may select to or automatically be added to the conference call if the caller is a member of that community of interest. A determination of whether the caller is a member of the community of interest may be done as part of the caller validation process or based on collected caller-related information (e.g., ANI information). If a caller is not a member of the community of interest, the caller typically will not be allowed to join the conference call in progress. In other implementations, a caller will only be allowed to initiate a conference call with a community of interest if that caller is a member of the community of interest.

The caller may identify the community of interest to the ICCPS 140 by calling a specific number that the ICCPS 140 associates with a particular community of interest. For example, the caller may call "1-800-Go Drows" to setup a conference call with the community leaders of the Drows suburbs in Pewaukee, Wis. Additionally or alternatively, the caller may call a general number and be prompted by the ICCPS 140 to input or otherwise specify the community of interest.

The caller also may manually specify each member in a community of interest. For example, the caller telephone 110 may provide a visual display of potential call recipients and enable the caller to select or otherwise input the members in the particular community. The caller also may input a name for the manually created community of interest or, alternatively, a default name may be selected automatically (e.g., "manually created group"). The caller telephone 110 may include or be integrated within or operate as a PDA or general purpose computer that stores locally the user identities of potential call recipients in, for example, an address book or communicates with the ICCPS 140 to receive the user identities of potential call recipients. Additionally or alternatively, the address book may reside in a remote host-based data store and be accessible to the telephone 110 and/or be accessible to or be a part of the ICCPS 140. In another implementation, the ICCPS 140 may send to the caller telephone 110 only the user identities that are determined to be online or may send all user identities but may flag or otherwise denote the user identities that are online. The visual display also may allow the caller to send Instant Messages to the potential call recipients that are online and may initiate a conference call if all of the potential call recipients indicate availability to participate in the conference call.

After a community of interest has been identified, the ICCPS 140 determines the user identities of the members within the community of interest. The ICCPS 140 may store the user identities in a data store or, additionally or alternatively, may query one or more external systems to retrieve the user identities. Rather than or in addition to tracking presence information directly, the ICCPS 140 queries one (or more) external online service provider systems 160 for presence information corresponding to each user identity. Upon receiving the presence information from the online service provider system(s) 160, the ICCPS 140 generates a call notification message for each user identity that is determined to be online. The ICCPS 140 sends or publishes the call notification messages to the online service provider system(s) 160 which, in turn, send the call notification messages to the recipients. The call recipient computer systems 165, 170 receive the call notification messages from the online service provider system(s) 160 and enable the potential call recipients to perceive the call notification messages as, for example, pop-up windows in a visual display.

A call notification message (or electronic conference call invitation) typically includes the identity of the caller that initiated the conference call (determined based on, for example, Automatic Number Identification (ANI) information), an identifier for the community of interest designated by the caller, a subject matter or topic for the conference call (e.g., "The hottest places to hunt in Wisconsin—A discussion by framed hunter Bob Rayburn"), the expected duration of the conference call (e.g., 20 minutes), and a set of options that may be selected by the potential call recipient to indicate whether and how the potential call recipient will participate in the conference call and, in some implementations, how the potential call recipient wishes to connect to the ICCPS 140 (e.g., via a traditional telephone over the telephone network 130 or via a data telephone or computer over the data network 150). The ICCPS 140 is configured to receive, over the data network 150 and through the online service provider system(s) 160, the options selected by the potential call recipients in response to the call notification messages. The ICCPS 140 receives option selections at different times dependent on the time it takes for each individual potential call recipient to select from among the options presented in the call notification message. After the ICCPS 140 receives option selections from all of the potential call recipients or, additionally or alternatively, after a predetermined interval of time (e.g., 2 minutes), the ICCPS 140 processes the option selections. In another implementation, the ICCPS 140 processes the option selections as they are received.

When the ICCPS 140 receives an option selection from a potential call recipient, the ICCPS 140 may send an update call notification message to the call recipient computer systems 165, 170 associated with the other potential call recipients indicating the option selected by that potential call recipient. The update call notification message updates the call notification message by, for example, adding a status section to the call notification pop-up window or by adding a conference call participant status pop-up window that visually displays the conference call participation option selected by each call recipient. As each option selection is received by the ICCPS 140, another updated call notification message is sent to the potential call recipients and all of the potential call recipients (including those that have already responded) are able to see in the conference call participant status window or in the status section of the call notification window the responses already submitted by the other potential call recipients. If a potential call recipient has inputted a reason or message in response to, for example, selecting the option to not participate in the call, the status section of the call notification window or the call participant status window may display that message to all of the potential call recipients. The call participant status window also may optionally include a message informing nonparticipating potential call recipients whether the conference call is in progress and may include a link selectable by the non-participating potential call recipients to access or otherwise "jump-in" to the call when they become available to participate. The link is typically available only while the conference call is in progress.

Figure 6:
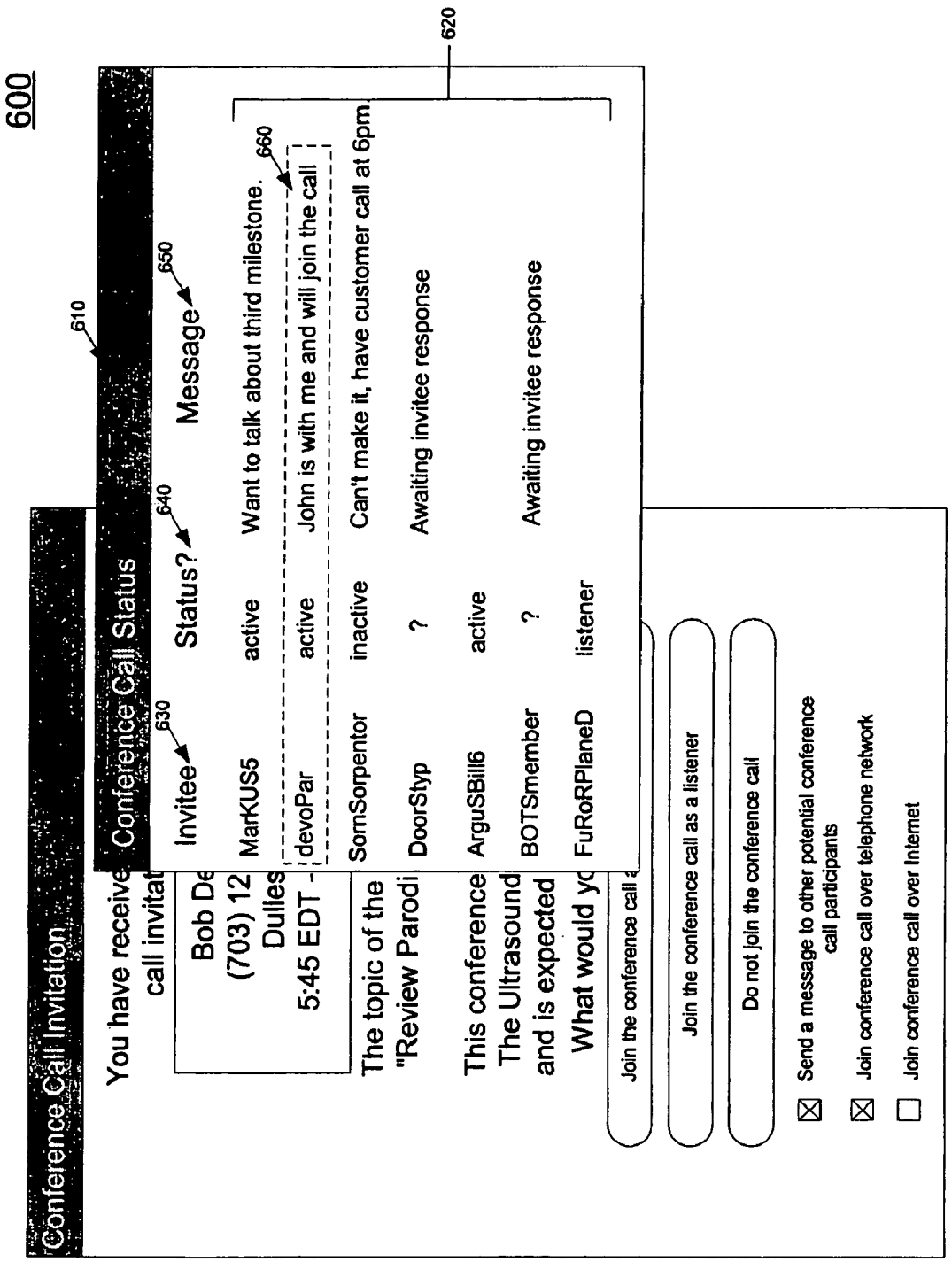
FIG. 6 illustrates an example of a user interface presented to a user upon receipt of an updated call notification message.

The ICCPS 140 may periodically revise the conference call participant status window or the status section of the call notification window to reflect the latest response status. The ICCPS 140 also may enable potential call recipients to opt-out of receiving update call notification messages, for a particular call or altogether. FIG. 6 shows an example of a user interface 600 including a conference call participant status window.

The ICCPS 140 processes the conference call connection options to establish bi-directional voice communication connections with the call recipients. If a call recipient has selected to connect to the conference call over the telephone network 130 using a traditional telephone connection, the ICCPS 140 identifies a direct number of a telephone associated with the user identity of the call recipient by, for example, accessing an account record in a configuration data store, and uses the direct number to place an outbound telephone call to the call recipient telephone 115, 120. If the direct number of the telephone associated with the user identity is busy or not answered, the ICCPS 140 is configured to send an error message to the call recipient computer system 165, 170 associated with that user. The error message may allow the call recipient to enter a new number to which the outbound call may be directed, or additionally or alternatively, to select to connect to the ICCPS 140 using the call recipient computer system 165, 170 (e.g., via Voice-over-IP).

If a call recipient has selected to connect to the conference call over the data network 150 using the call recipient computer system 165, 170, the ICCPS 140 employs a telephony gateway to establish a bi-directional audio channel between the telephony gateway and the call recipient computer system 165, 170 over the data network 150. The telephony gateway may be, for example, an Internet telephony gateway using a voice-over-IP communications protocol.

When the call recipient telephones 115, 120 and/or call recipient computer systems 165, 170 are connected to the ICCPS 140 for voice communications, the ICCPS 140 initiates a conference call in accordance with the conference call participation options selected by each participant. For example, if a participant desires to be a listener, the ICCPS 140 changes the bi-directional voice path or audio channel to a unidirectional voice path or audio channel. The unidirectional voice path or audio channel allows the call recipient to receive audio data and thus listen to the conference call but does not allow the call recipient to send audio data and thus contribute vocally to the conference call.

The data network 150 may be any type of network that carries data including, for example, the Internet, an intranet or any combination of data bearing networks. The data network 150 may include one or more wired or wireless networks (e.g., General Packet Radio Networks). The data network 150 may be, for example, a data network using Internet Protocol (IP). The term "data" as used herein is representation of information in a formalized manner suitable for communication, interpretation or processing. This information can include, for example, text, audio, image, video, and/or multimedia.

In some implementations, the data network 150 and the telephone network 130 are implemented as a single or otherwise integrated communications network configured to enable voice communications between the caller telephone 110, the call recipient telephones 115, 120, and the ICCPS 140, and to enable communications between the ICCPS 140, the online service provider system 160, and the call recipient computer systems 165, 170, The online service provider system 160 is a computer system configured to provide online data communications services to users, detect online presence of a user of the call recipient computer system 165, 170, receive a call notification message from the ICCPS 140, generate and send the format data along with the call notification message to the call recipient computer system 165, 170, and send option selections from the call recipient computer system 165, 170 to the ICCPS 140. The online data communications services may include for example, e-mail services, Instant Messaging services, Internet access, and/or access to online content.

The online service provider system 160 may, for example, detect online presence of a user of the call recipient computer system 165, 170 by leveraging an Instant Messaging system, or by performing presence detection in a manner similar to that used to detect presence in an Instant Messaging system and/or in a manner similar to that disclosed in application Ser. No. 10/414,167, hereby incorporated by reference in its entirety (in which client-side communication device monitors are used). The online service provider system 160 is also configured to receive a call notification message from the ICCPS 140, generate format data that is used to format the call notification messages for presentation on the call recipient computer system 165,170, and send the call notification messages to the call recipient computer system 165, 170 in near real time.

The format data may vary based on device type. For example, with limited capabilities, the format data for a PDA may enable the PDA to limit the call notification message to a visual indication of the incoming call (e.g., illumination of a light and a graphical display of a call icon and the caller telephone direct number or identity proxy thereof) and may further limit the conference call options that are presented to the user to a subset of the full suite of options (e.g., the option to participate in the call or not to participate in the call). In contrast, the format data sent to a home computer may enable the home computer to provide, for example, an audio and visual indication of the call and to display full caller identity information including address, return telephone number, and other information about the caller accessible based on the caller telephone number. The format data sent to the home computer also may enable the home computer to present to the user a significantly larger number of call handling options (e.g., the option to actively participate, to listen, to not participate, to connect over the telephone network, to connect over the data network, and to send audio or text messages to other participants).

The online service provider system 160 is also configured to transmit, in near real time, the option selection from the call recipient computer system 165, 170 to the ICCPS 140. Near real time transmission of the option selection is important because transmission delays can result in a delay in initiating the conference call. Accordingly, the online service provider system 160 may be configured to avoid or altogether prohibit queuing call notification messages or option selections or further processing the call notification messages or option selections in any way that increases transmission delay. The online service provider system 160 may be configured to provide this functionality in a manner similar to that used by Instant Messaging systems, or even to leverage Instant Messaging systems to enable transmission and receipt of instant messages in near real time.

The call recipient computer systems 165, 170 are configured to receive call notification messages and format data from the online service provider system 160, process the call notification messages in accordance with the format data to enable a user to perceive the call notification message, accept user selection of options offered by the call notification messages, and send the option selection to the online service provider system 160. The call recipient computer systems 165, 170 each include a device 165A, 170A capable of executing instructions under the command of a controller 165B, 170B. The device 165A, 170A may be a general purpose computer, such as a workstation or a personal computer, a PDA, a special purpose computer, an intelligent mobile telephone, a pager, or a set top box.

The controller 165B, 170B commands and directs communications between the device 165A, 170A of the call recipient computer system 165, 170 and the online service provider system 160. The controller 165B, 170B may include one or more software or hardware applications that enable digital communications to be received from the online service provider system 160. For example, the controller 165B, 170B may be a modified Instant Messaging application configured to receive notification messages and send option selections in a manner similar to that used to receive instant messages and send instant messages. The device 165A, 170A is connected to the controller 165B, 170B by a wired, wireless or virtual (i.e., when the controller is software running on the device) data pathway 165C, 170C capable of delivering data.

Figure 2A:
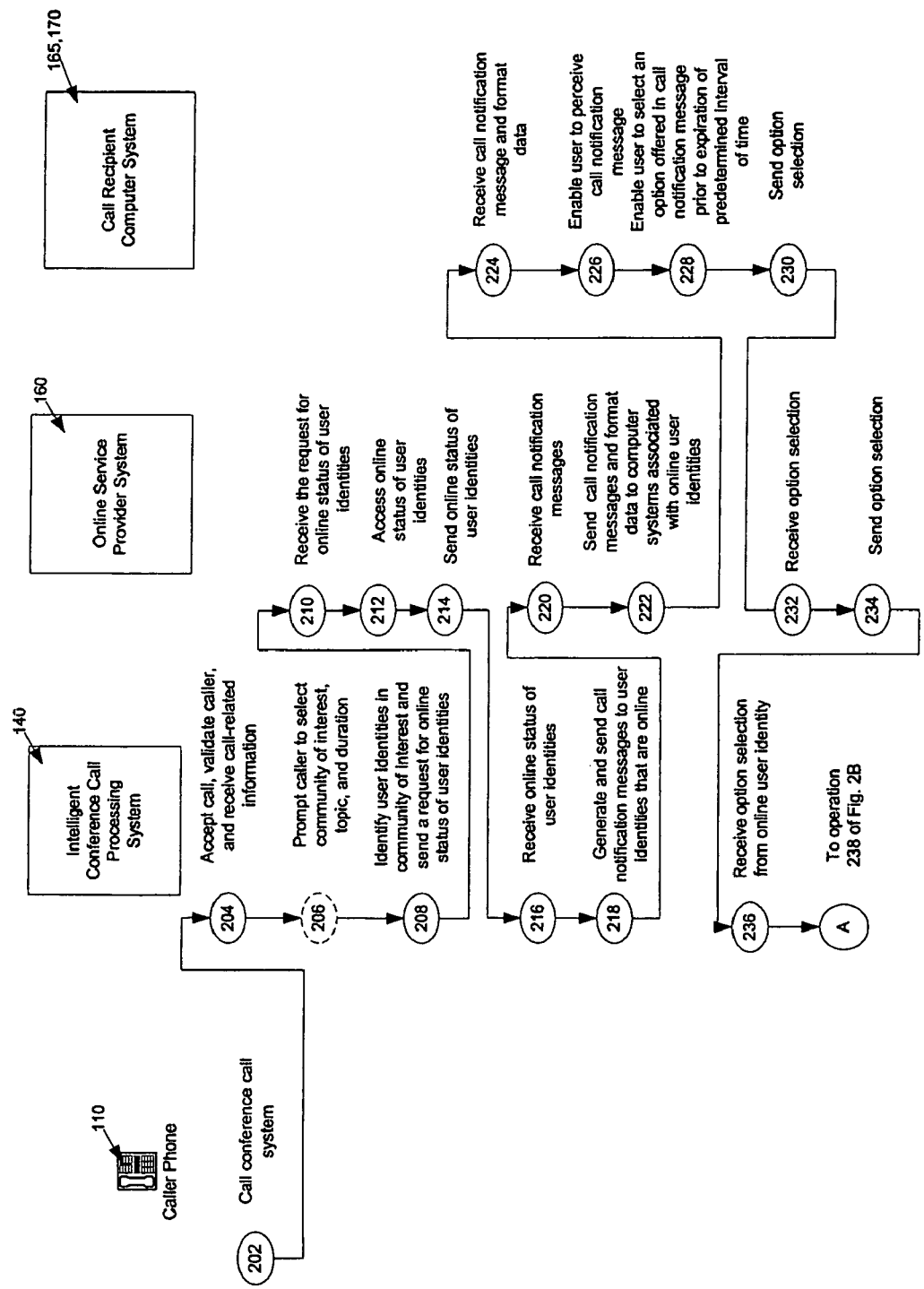
FIGS. 2A and 2B are flow charts illustrating a process for initiating a conference call using an electronic messaging interface.
Figure 2B:
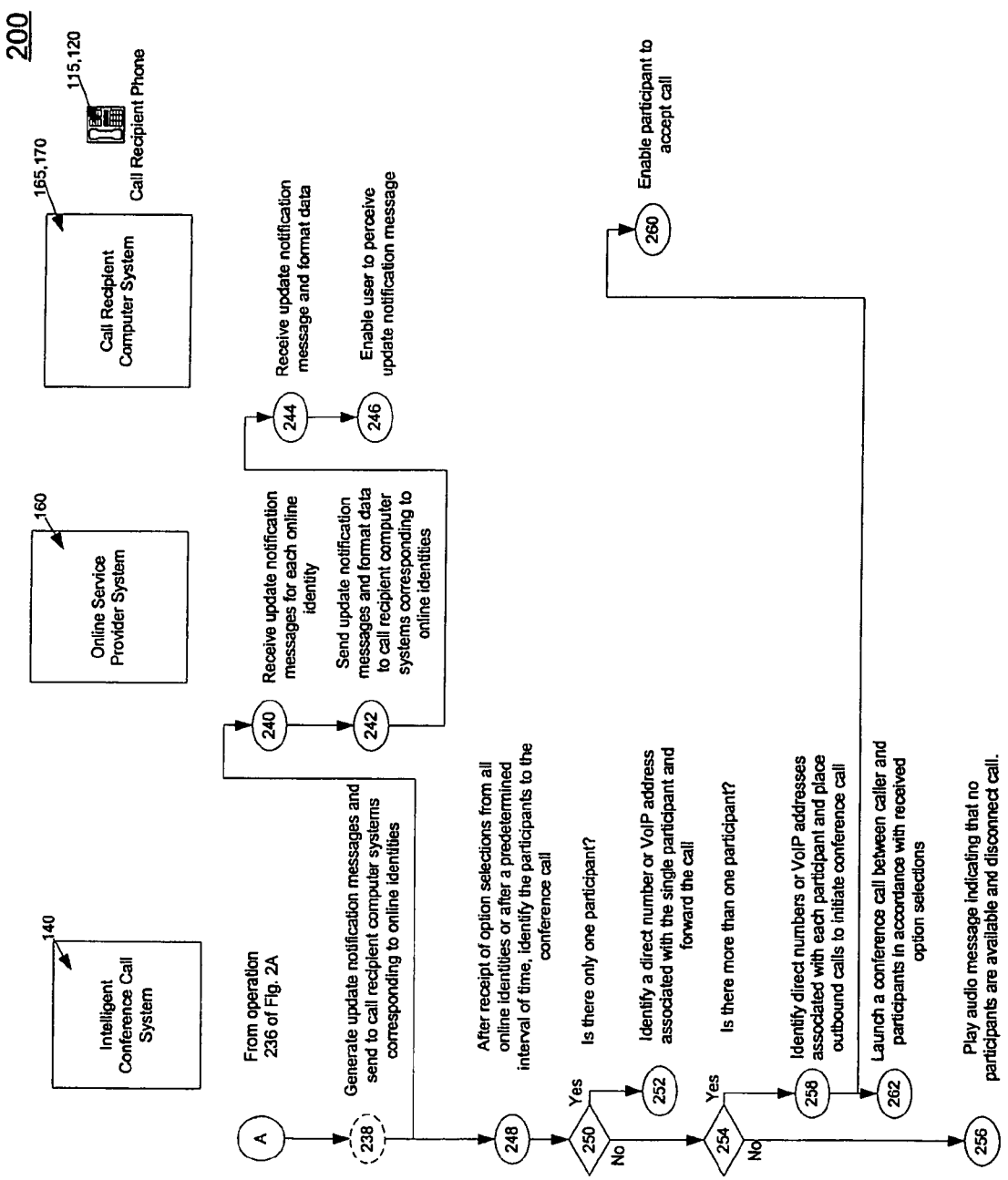

FIGS. 2A and 2B show a process 200 for initiating a conference call using an electronic messaging interface. For convenience, particular components described with respect to FIG. 1A are referenced as performing the process 200. However, similar methodologies may be applied in other implementations where different components are used to define the structure of the system, or where the functionality is distributed differently among the components shown by FIG. 1A.

The user of the caller telephone 110 calls the ICCPS 140 (202). The ICCPS 140 accepts the call, validates the caller by, for example, prompting the caller for a caller identity and a password, and receives call-related information (204). Once the caller is validated, the ICCPS 140 prompts the caller to input a topic for the conference call and an expected conference call duration and prompts the caller to select a community of interest (206). In another implementation, the telephone number used to call the ICCPS 140 determines the community of interest and, therefore, selection of the community of interest is not necessary. The caller may be prompted to select a community of interest from a list of communities presented to the caller as audio or, alternatively, the caller may select the community of interest from a textual list sent to the caller telephone 110 over the data network 130 (i.e., this implementation assumes that the caller telephone 110 has data communication capabilities to receive and send data over the data network 150). The ICCPS 140 may access a configuration data store to retrieve community configuration data that is used to identify the set of communities of interest from which a given caller may select. The communities of interest may include communities available globally and personalized communities available only to the caller. The ICCPS 140 may use the call-related information to identify the caller and to access a personalized set of communities of interest tailored to or otherwise setup for that particular caller.

Once the caller has selected a community of interest, the ICCPS 140 identifies user identities associated with the selected community of interest and sends a request for the online status of the user identities (208). The online service provider system 160 receives the request for the online status of the user identities (210) and accesses the online status of the user identities (212). The online status of the user identities may be stored, for example, in a presence data store that is periodically updated in real-time in a manner similar to that used in Instant Messaging systems to reflect activity of a user at the call recipient computer system 165, 170. The online service provider system 160 sends the online status of the user identities to the ICCPS 140 (214).

The ICCPS 140 receives the online status of the user identities from the online service provider system 160 (216). If no user identities are online, the ICCPS 140 informs the caller through an audio message that no users are available to join the conference call and disconnects the call or prompts the caller for another community of interest (not shown). If one or more user identities are online, the ICCPS 140 generates and sends call notification messages addressed to the user identities that are online (i.e., online user identities) (218). The call notification messages typically are sent out in parallel by the ICCPS 140 to minimize transmission delays and the arrival time difference between call recipient computer systems 165, 170.

The online service provider system 160 receives the call notification messages for each online user identity (220) and sends the call notification messages along with format data to call recipient computer systems 165, 170 corresponding to the online identities (222). The receiving of the call notification messages and sending of the call notification messages and format data is performed in real time. The call notification messages typically are sent out in parallel by the online service provider system 160 to minimize transmission delays and the arrival time difference between call recipient computer systems 165, 170.

Figure 5A:
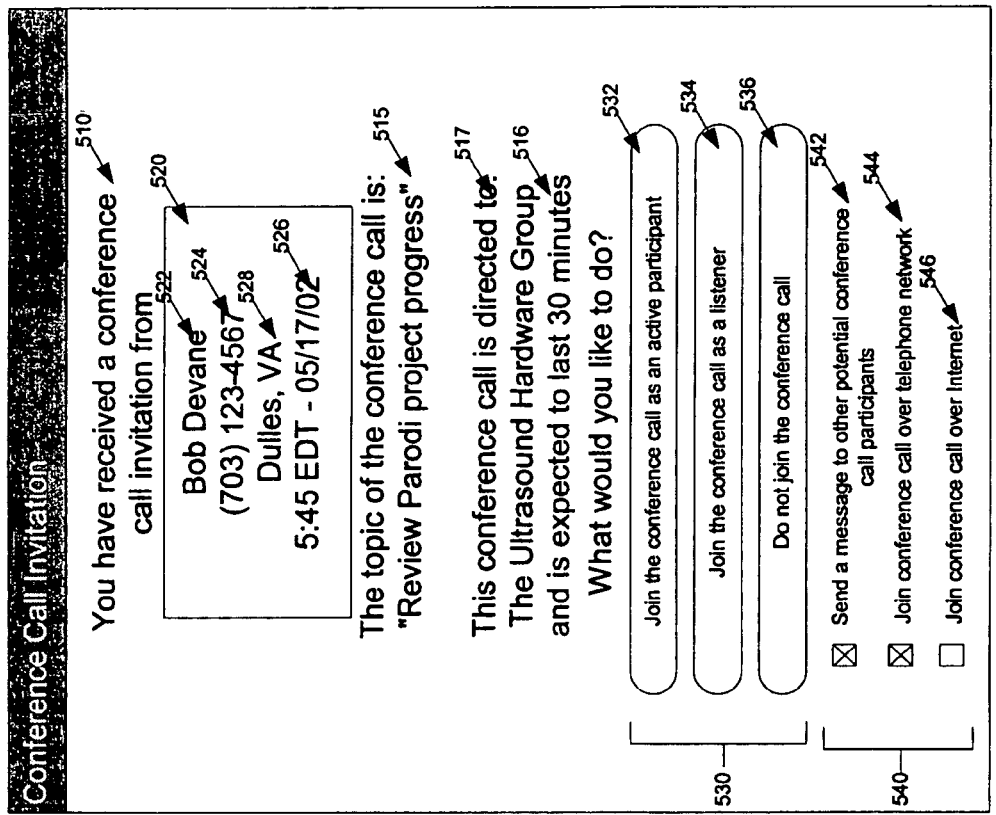
FIGS. 5A and 5B illustrate an example of a user interface presented to a user upon receipt of a call notification message.

Each call recipient computer system 165, 170 receives the call notification message and format data (224) and enables a user to perceive the call notification message (226). In one implementation, the call recipient computer system 165, 170 enables users to perceive the call notification message as a pop-up window or dialog box that appears on a visual display of the call recipient computer system 165, 170. FIG. 5A shows an example of a user interface 500 depicting a call notification message.

The call recipient computer system 165, 170 enables a user to select an option offered in the call notification message prior to expiration of a predetermined time interval (e.g., two minutes) (228). The call recipient computer system 165, 170 sends the option selection to the online service provider system 160 (230).

The online service provider system 160 receives the option selection (232) and sends the option selection to the ICCPS 140 (234), and does so in real time. The ICCPS 140 receives the option selection (236). The ICCPS 140 generates an updated call notification message for each online identity and sends the updated call notification messages to the online service provider system 160 (238). The online service provider system 160 receives the updated call notification messages (240) and sends the updated call notification messages to the corresponding call recipient computer systems 165, 170 (242).

Each call recipient computer system 165, 170 receives an updated call notification message (244) and enables a user to perceive the updated call notification message (246). In one implementation, the updated call notification message is presented to users as a dialog box or pop-up window that includes a status section visually displaying the conference call participation option selected by that potential call recipient and the options selected by any other potential call recipients that previously sent option selections to the ICCPS 140. The selected option is shown along with a user identifier corresponding to the potential call recipient from which the selected option was received. The status section also may include a message inputted by the potential call recipient in response to the notification message. For example, the message may indicate why the potential call recipient has chosen not to participate in the conference call. FIG. 6 shows an example of a user interface 600 including a conference call participant status window.

In another implementation, the status presented in the updated call notification message does not identify specific potential call recipients but rather presents a total number of potential call recipients that have responded to the call notification message by sending an option selection and the total number of potential call recipients that have not responded. The total number of potential call recipients that have responded may further be subdivided into the number of potential call recipients that have chosen to participate actively, participate as a listener, and not participate.

In yet another implementation, the updated call notification message also may be sent to the caller that initiated the conference call. The updated call notification message may be sent to a caller computer system (not shown) having similar characteristics as the call recipient computer systems 165, 170 or, additionally or alternatively, the updated call notification message may be sent to the caller telephone 110 over the data network 150 (i.e., this implementation assumes that the caller telephone 110 has data communication capabilities to receive and send data over the data network 150) or, alternatively, may be sent as an audio message over the telephone network 130. The audio message may inform the caller of the current participation status of the potential call recipients.

If the ICCPS 140 does not receive an option selection within a predetermined time interval from any of the call recipient computer systems 165, 170 that received call notification messages (e.g., at 224), the ICCPS 140 stops accepting option selections and identifies the participants to the conference call based on the already received option selections (248). The ICCPS 140 identifies the participants by analyzing the conference call participation option selections received from the potential call recipients.

The ICCPS 140 determines whether only one potential call recipient desires to participate in the conference call (250). If only one potential call recipient desires to participate in the conference call, the ICCPS 140 sends an audio message to the caller telephone 110 informing the caller that only one participant wishes to join and that the call will be forwarded to the call recipient. If the conference call connection options associated with that call recipient indicate that the call recipient wishes to use the call recipient telephone 115, 120 to connect to the conference call over the telephone network 130, the ICCPS 140 forwards the call to the call recipient telephone 115, 120 by providing the telephone network 130 with the appropriate signaling information (252). If the conference call connection options associated with that call recipient indicate that the call recipient wishes to use the call recipient computer system 165, 170 to connect to the conference call over the data network 140, the ICCPS 140 establishes a bi-directional audio channel with the call recipient computer system 165, 170 and employs a telephony gateway to enable communication exchanges between the caller telephone 110 and the call recipient computer system 165, 170 (not shown).

The ICCPS 140 determines whether more than one potential call recipient wishes to participate in the conference call (254). If more than one potential call recipient wishes to participate in the conference call, the ICCPS 140 establishes a bi-directional (or unidirectional, if the potential call recipient decides to listen to rather than to actively participate in the conference call) voice communications connection with each potential call recipient in accordance with their conference call connection option selection. Accordingly, for a potential call recipient that wishes to establish a communications connection over the telephone network 130 using the call recipient telephone 115, 120, the ICCPS 140 identifies a direct number associated with the potential call recipient and uses the direct number to place an outbound call to the call recipient telephone 115, 120 (258). When the call recipient accepts the call, the communications connection is setup (260). If the call recipient does not accept the call or is otherwise unavailable to receive the call (e.g., the line is busy), the ICCPS sends an error message to the corresponding call recipient computer system 165, 170. For a potential call recipient that wishes to establish a communications connection over the data network 150 using the call recipient computer system 165, 170, the ICCPS 140 employs a telephony gateway to establish a bi-directional audio channel with the call recipient computer system 165, 170 (not shown). Once all of the connections between the ICCPS 140 and the call recipients have been setup, the ICCPS 140 launches the conference call (262). In another implementation, the ICCPS 140 may launch the conference call as soon as one connection is setup between the ICCPS 140 and a call recipient. The ICCPS 140 enables each subsequent call recipient to access the call while the call is in progress by setting up an associated connection upon the subsequent call recipient selecting to participate in the call.

If no potential call recipients wish to participate in the conference call, the ICCPS 140 sends an audio message to the caller telephone 110 indicating that no participants wish to join in the conference call. After sending or playing the audio message, the ICCPS 140 disconnects the call or enables the caller to select another community of interest (256).

Figure 3:
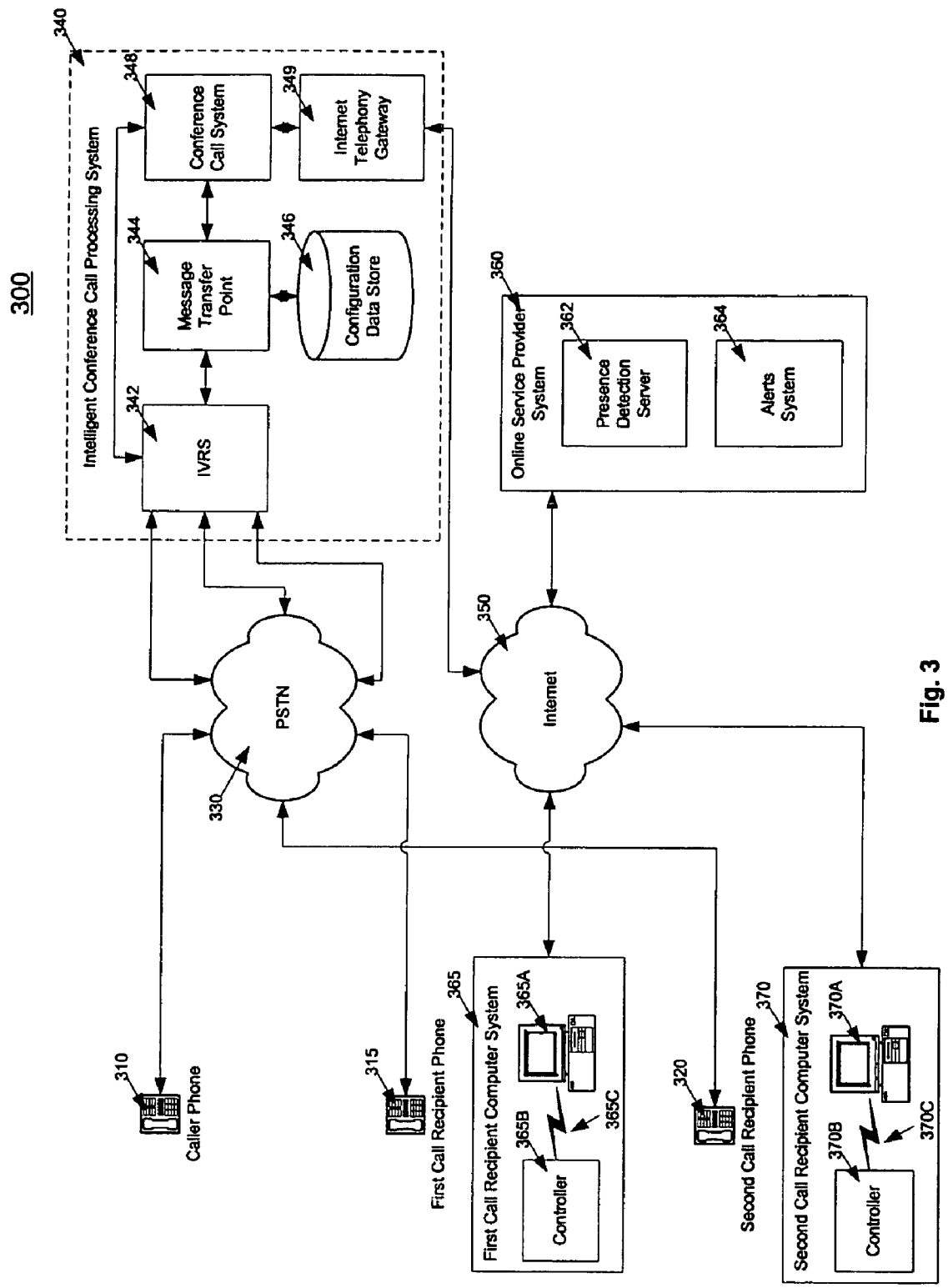
FIG. 3 is a block diagram illustrating a communications system for initiating a conference call using an electronic messaging interface.

FIG. 3 shows one exemplary implementation 300 of the communications system 100 of FIG. 1A configured to initiate a conference call using an electronic messaging interface. The communications system 300 includes a caller telephone 310, a first call recipient telephone 315, a second call recipient telephone 320, the Public Switched Telephone Network (PSTN) 330, an ICCPS 340, the Internet 350, an online service provider system 360, a first call recipient computer system 365, and a second call recipient computer system 370. Each call recipient computer system 365, 370 includes a device 365A, 370A that communicates with a controller 365B, 370B over a data pathway 365C, 370C. Examples of each element within the communications system 300 of FIG. 3 are described broadly above with respect to FIG. 1A. In particular, the caller telephone 310, the call recipient telephones 315, 320, the PSTN 330, the Internet 350, and the call recipient computer systems 365, 370 typically have attributes comparable to those described with respect to the caller telephone 110, the call recipient telephones 115, 120, the telephone network 130, the data network 150, and the call recipient computer systems 165, 170 of FIG. 1A, respectively. Likewise, the ICCPS 340 and the online service provider system 360 typically have attributes comparable to and illustrate one possible implementation of the ICCPS 140 and the online service provider system 160 of FIG. 1A. FIG. 3 shows two representative call recipients and their associated telephones 315 and 320 and computer systems 365 and 370. The communications system 300, however, may include any number of call recipients.

The ICCPS 340 includes an interactive voice response system (IVRS) 342, a message transfer point 344, a configuration data store 346, a conference call system 348, and an Internet telephony gateway 349. The online service provider system 360 includes a presence server 362 and an alerts system 364.

The IVRS 342 is a telephony-facing computer system configured to send call handling instructions to the PSTN 330 and store, record, and send audio messages to the caller telephone 310 through the PSTN 330. The IVRS 342 receives a call from the caller telephone 310 and receives call-related information over a signaling channel from the PSTN 330.

The IVRS 342 may use the call-related information to validate the caller or, additionally or alternatively, may validate the caller by, for example, prompting the caller for a password and user identity. The IVRS 342 may send the call-related information and, if applicable, the user identity and password to the message transfer point 344. The message transfer point 344 may access the configuration data store 346 and validate the caller by verifying that the call-related information or user identity and password match with that in an active subscriber record.

The IVRS 342 also may send a request for community configuration data to the message transfer point 344. The community configuration data is general data or, additionally or alternatively, data specific to a caller that identifies the communities of interest selectable by the caller. After receiving the community configuration data, the IVRS 342 may prompt the caller to select a community of interest from those available to the caller. The IVRS 342 sends the caller community of interest selection to the message transfer point 344.

In another implementation, the IVRS 342 may send the call-related information including the direct number dialed by the caller to the message transfer point 344. The message transfer point 344 may then identify the community of interest by accessing the configuration data store 346 based on the direct number dialed by the caller. The community of interest may be uniquely identified in this manner, or, alternatively, the message transfer point 344 may use the direct number to identify and retrieve community configuration data representative of a set of communities of interest associated with the direct number. The message transfer point 344 may send this community configuration data to the IVRS 342 which may then prompt the caller to select from among this set of communities of interest.

The IVRS 342 also may be configured to send the appropriate instructions to the PSTN 330 over a signaling channel to forward the call to a direct number of a call recipient telephone 315, 320 if the message transfer point 344 indicates that only one participant wants join the conference call. If the message transfer point indicates that no participants want to join the conference call, the IVRS 342 may be configured to play an audio message to the caller indicating that no participants wish to join the call and may then disconnect the call or, alternatively, may prompt the caller to select another community of interest.

The IVRS 342 is also configured to place one or more outbound calls to potential call recipients if the message transfer point 344 indicates that more than one participant wants to join the conference call and at least one of the participants wants to connect to the conference call over the PSTN 330. Once a potential call recipient accepts the call, the IVRS 342 may transfer the voice path of the call over the PSTN 330 to the conference call system 348 via an intelligent transfer mechanism. The intelligent transfer mechanism may be, for example, Release Link Trunking or 2B-Channel Transfer. Alternatively, the IVRS 342 may internally connect the call to the conference call system 348 by setting up additional voice paths through the IVRS 342 to the conference call system 348.

The message transfer point 344 is an IP-facing computer system that performs various call management and data processing functions. These functions include validating a caller that calls the IVRS 342, accessing and sending community configuration data to the IVRS 342, receiving from the IVRS 342 and processing the caller community of interest selection, requesting from the presence detection server 362 the online status of the user identities corresponding to potential call recipients that are members of the selected community of interest, generating and sending call notification messages to the online potential call recipients via the alerts system 364, receiving option selections from the alerts system 364, and sending instructions corresponding to the received option selections to the IVRS 342, the conference call system 348, and the Internet telephony gateway 349.

The message transfer point 344 may access the configuration data store 346 to both validate a call received by the IVRS 342 and to retrieve community configuration data. The community configuration data may be, for example, indexed by or otherwise retrievable based on the telephone number of the caller, the user identity specified by the caller, and/or the direct number dialed by the caller.

The message transfer point 344 receives and processes the conference call participation option selections and the conference call connection option selections of the potential call recipients. If no participants desire to join the conference call, the message transfer point 344 instructs the IVRS 342 to send an audio message to the caller indicating that no participants wish to join the call. If only one participant desires to join the conference call and that participant has selected to join the conference call over the PSTN 330, the message transfer point 344 instructs the IVRS 342 to forward the call to the call recipient telephone 315, 320 of the single willing participant (i.e., to the direct number associated with the single willing participant). If one or more participants desire to join the conference call and have selected to join the call over the Internet 350, the message transfer point 344 instructs the Internet telephony gateway 349 to establish a bi-directional audio channel with the call recipient computer systems 365, 370 associated with each of the corresponding participants. If more than one participant desires to join the conference call and have selected to join the call over the PSTN 330, the message transfer point 344 instructs the IVRS 342 to place outbound calls to the call recipient telephones 315, 320 associated with the corresponding participants (i.e., to the direct numbers associated with the willing participants).

The message transfer point 344 also sends instructions to the conference call system 348 to setup the conference call. The instructions typically include the number of participants, the data indicating the level of participation of each participant (e.g., active participation or just listening), and identification information that allows the conference call system 348 to identify the connections through which each of the participants will participate in the conference call. In one implementation, the identification information includes the direct telephone numbers of the participants (e.g., the destination telephone number of the outbound calls placed by the IVRS 342 or the telephone number assigned to the participant by the Internet telephony gateway 349). The conference call system 348 may then identify the connection associated with that participant using, for example, DNIS. In another implementation, the identification information includes the channels or the trunk group through which the conference call system 348 receives the voice path associated with that participant. This implementation is typically used when the IVRS 342 internally connects the call associated with the participant to the conference call system 348 by setting up an additional voice path through the IVRS 342 to the conference call system 348.

The configuration data store 346 is a data storage device that is communicatively coupled to the message transfer point 344 and that includes account records, community configuration data records, and community data records. The account records store information related to a subscriber of the conference call service and may be indexed, for example, by subscriber telephone number and/or user identity. The account records may be accessed to determine whether the subscriber is an active subscriber and to determine the call notification message preferences of the subscriber.

Call notification message preferences are instructions typically specified by each user identity that indicate how the call notification message sent to that user identity should be formatted and what options should appear in the call notification message. The options may include call participation options and call connection options. The call participation options may include active participation, listener, no participation, and send audio or text message reply. The audio or text message reply is typically sent when the subscriber does not wish to participate in the conference call and to provide some reasons for not participating. The audio or text message reply to the call notification message may be inputted dynamically by the subscriber upon receipt of the call notification message or may be chosen from among a predetermined set of options (e.g., "Cannot participate due to other preexisting commitment," and "Sorry, but I am busy right now,"). The call connection options may include connecting to the conference call using a traditional telephone connection over the PSTN 330 using, for example, the call recipient telephone 315, 320, or connecting to the conference call using the call recipient computer system 365, 370 (e.g., which may be a data telephone) which may be configured to establish and communicate using a bi-directional audio channel over the Internet 350.

The community configuration data records store the community configuration data for that subscriber and may be indexed, for example, by subscriber telephone number and/or user identity. The community configuration data may take the form of a set of data entries specific to a subscriber that include community of interest identifiers for the communities of interest available to that subscriber. In another implementation, the account records include the community configuration data for that subscriber, and, therefore, community configuration data records are not used.

The community data records include a set of data entries specific to a community of interest that include user identifiers for the members in that community of interest. Each user identifier typically includes a telephone number for that user and may include other information related to establishing a bi-directional voice path with the user across the PSTN 330 or the Internet 350 (e.g., IP address information). The community data records may be indexed, for example, by community of interest identifiers. In another implementation, the data in the community data records, the account records, and the community configuration data records may be subdivided, stored, and indexed in a different fashion than that described above (i.e., all of the data may be accessible in a single data record and indexed by subscriber user identifier).

The conference call system 348 is a telephony-facing computer system configured to receive conference call setup instructions from the message transfer point 344 and initiate a conference call in accordance with the conference call setup instructions. The conference call system 348 receives or accesses information on the number and type of participants (interactive or listen only) and reserves the appropriate quantity of contiguous audio bridging resources. The conference call system 348 configures these resources for both bi-directional and unidirectional (listen-only) participants. It then assigns ports to each of these resources and audio paths are established to those ports.

The conference call system 348 also manages audio bridging resources during the session. For example, the conference call system 348 frees bridging resources when audio paths are no longer attached to ports and reconfigures bridging resources if a participant elects to change between bi-directional and uni-directional participation during the conference. It also re-allocates and adds resources if additional parties elect to join later, or if the session is extended. Additionally, the conference call system 348 de-allocates resources at completion of a session.

In particular, the IVRS 342 sets up voice paths between the call recipient telephones 315, 320 and the conference call system 348 for potential call recipients that choose to participate in the conference call over the PSTN 330. The Internet telephony gateway 349 sets up voice paths from the Internet telephony gateway 349 to the conference call system 348 for potential call recipients that choose to participate in the conference call over the Internet 350 using the recipient computer systems 365, 370. The conference call system 348 identifies the voice path connections of each participant based on the identification information included in the instructions received from the message transfer point 344. The conference call system 348 uses the identification information to establish a bi-directional audio bridge that connects the voice paths of the participants. If a participant is a listener, the conference call system may change the voice path to a unidirectional voice path.

The Internet telephony gateway 349 is a computer system configured to be a digital telephony interface that converts packets of encoded voice data received over the Internet 350 into audio sent over voice paths established between the Internet telephony gateway 349 and the conference call system 348. The Internet telephony gateway 349 may use a typical CODECs (e.g., G. 711, G.723, or G.728) to encode and decode the packets of voice data. When a potential call recipient chooses the option to connect to the conference call over the Internet, the message transfer point 344 instructs the Internet telephony gateway 349 to establish a bi-directional audio channel (or, in some implementations, a unidirectional audio channel if the potential call recipient chooses to only listen to the conference call) with the recipient computer system 365, 370. The Internet telephony gateway 349 may communicate with the recipient computer system 365, 370 using, for example, a voice-over-IP communications protocol such as H.323 or SIP.

The Internet telephony gateway 349 also receives from the message transfer point 348 the telephone number or trunk group assigned to the call recipient. The Internet telephony gateway 349 may use the assigned telephone number or trunk group to establish a voice path for that call recipient from the Internet telephony gateway 349 to the conference call system 348. Packets of voice data received from that call recipient may then be decoded, converted to audio, and sent to the conference call system 348 over the appropriate voice path assigned to that call recipient. Similarly, audio received over the voice path assigned to the call recipient may be encoded and converted to voice data packets by the Internet telephony gateway 349 and then sent to the call recipient computer system 365, 370 over the Internet 350. In another implementation, the Internet telephony gateway 349 and the conference call system 348 are implemented as a single or otherwise integrated system configured to handle connections over the Internet 350 and over the PSTN 330.

The presence server 362 is a server that receives, updates, and publishes online presence data for each identity. The presence server 362 enables the message transfer point 344 to access online status data for particular user identities. In one implementation, the presence server 362 is functionally similar to the central server in an Instant Messaging system that receives periodic online status updates from call recipient computer systems 365, 370. In another implementation, the presence server 362 is functionally similar to the presence detection system disclosed in application Ser. No. 10/414,167 that receives communication device status data and user availability to perceive communications data from a device monitor coupled to the device 365B, 370B of the call destination computer system 370. In this implementation, the message transfer point 344 includes the functionality of a device monitoring system.

The alerts system 364 is a computer system configured to enable real time or near real time transmission of call notification messages to call recipient computer systems 365, 370 from the message transfer point 344 and transmission of the option selections from call recipient computer systems 365, 370 to the message transfer point 344. The alerts system 364 is configured to provide this functionality in a manner similar to that used by Instant Messaging systems to enable transmission and receipt of instant messages in real time. Such a system has been described, for example, in application Ser. No. 10/320,712, hereby incorporated by reference.

Figure 4A:
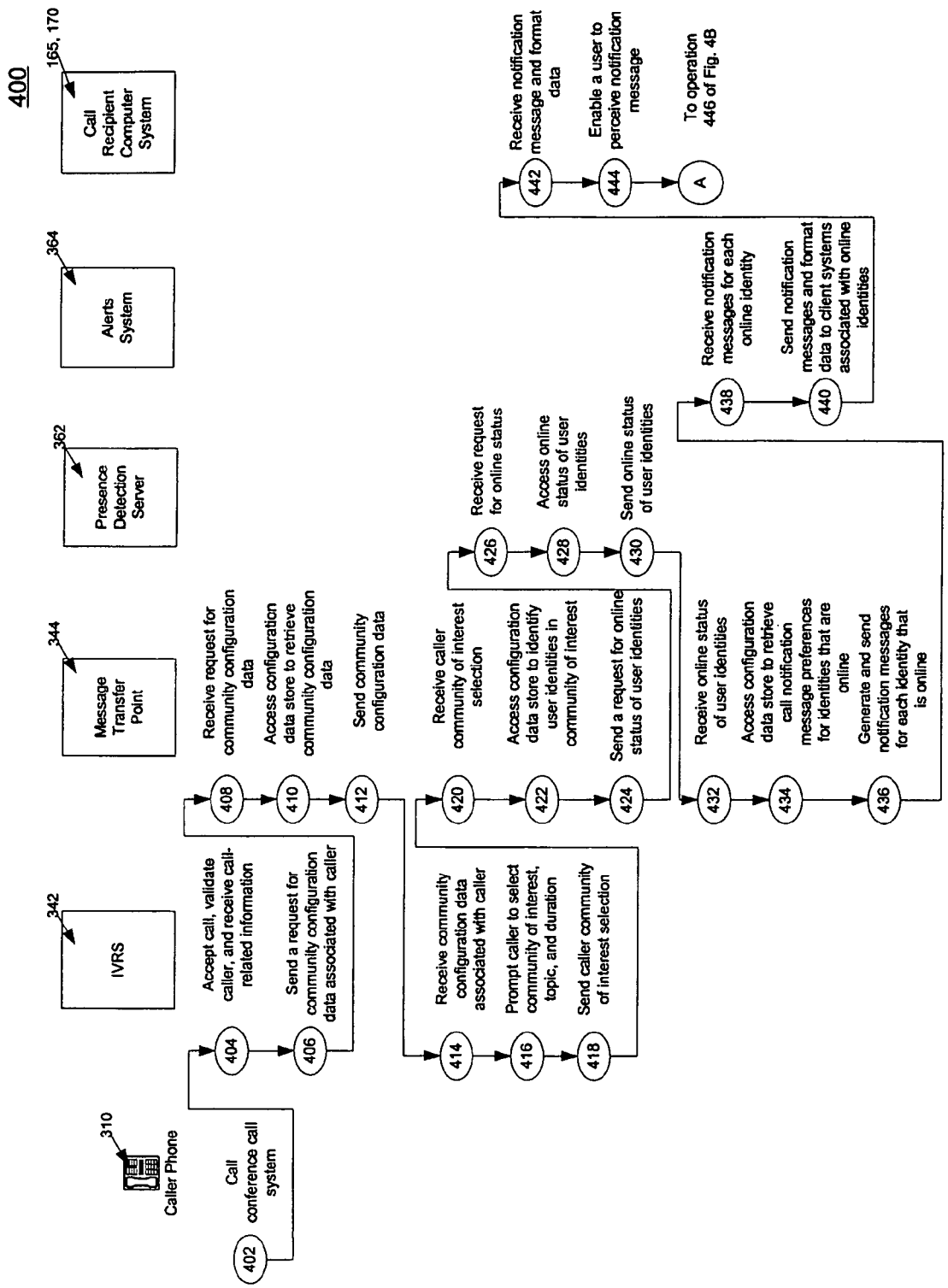
FIGS. 4A-4C are flow charts illustrating a process for initiating a conference call using an electronic messaging interface.
Figure 4B:
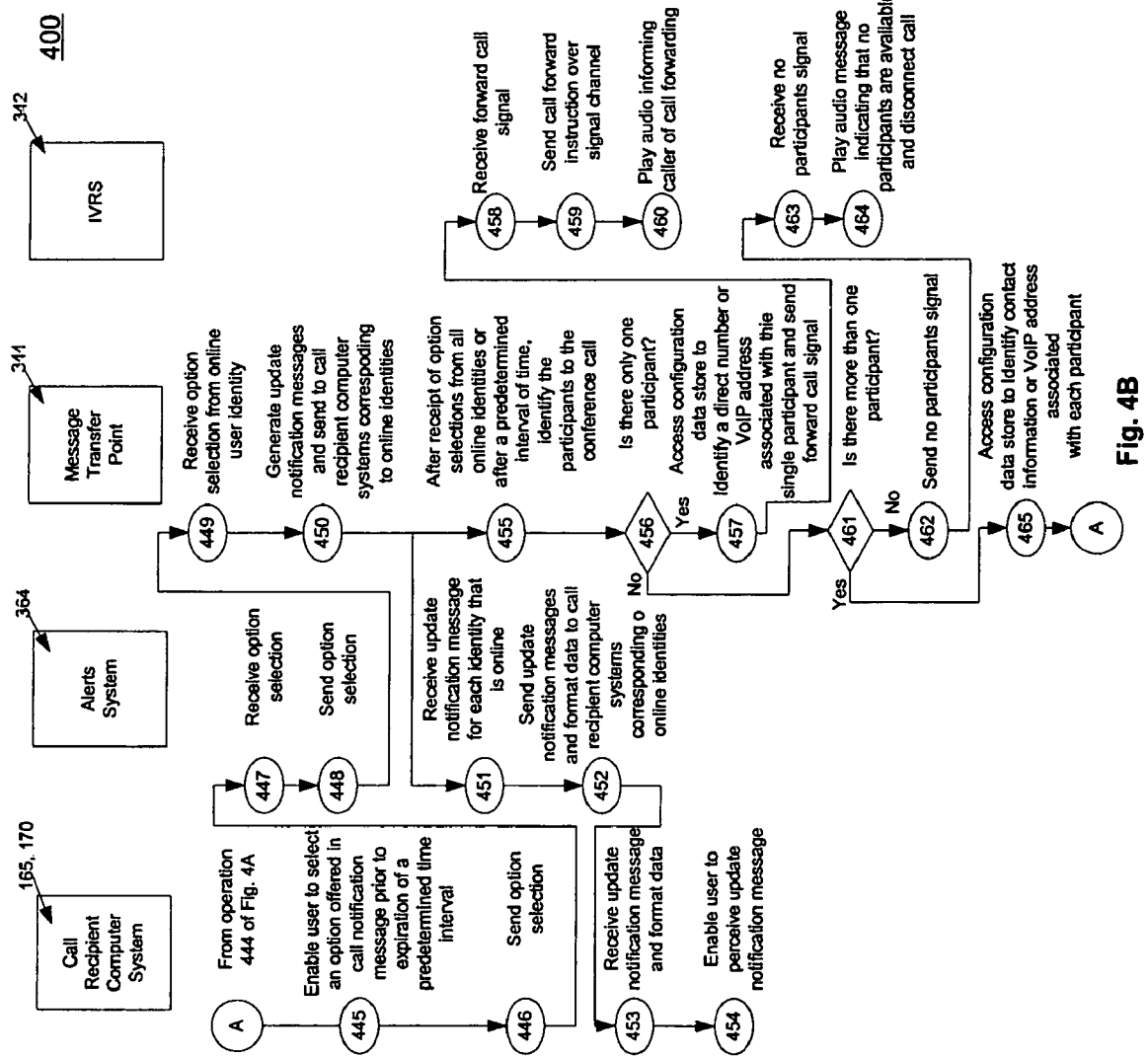
Figure 4C:
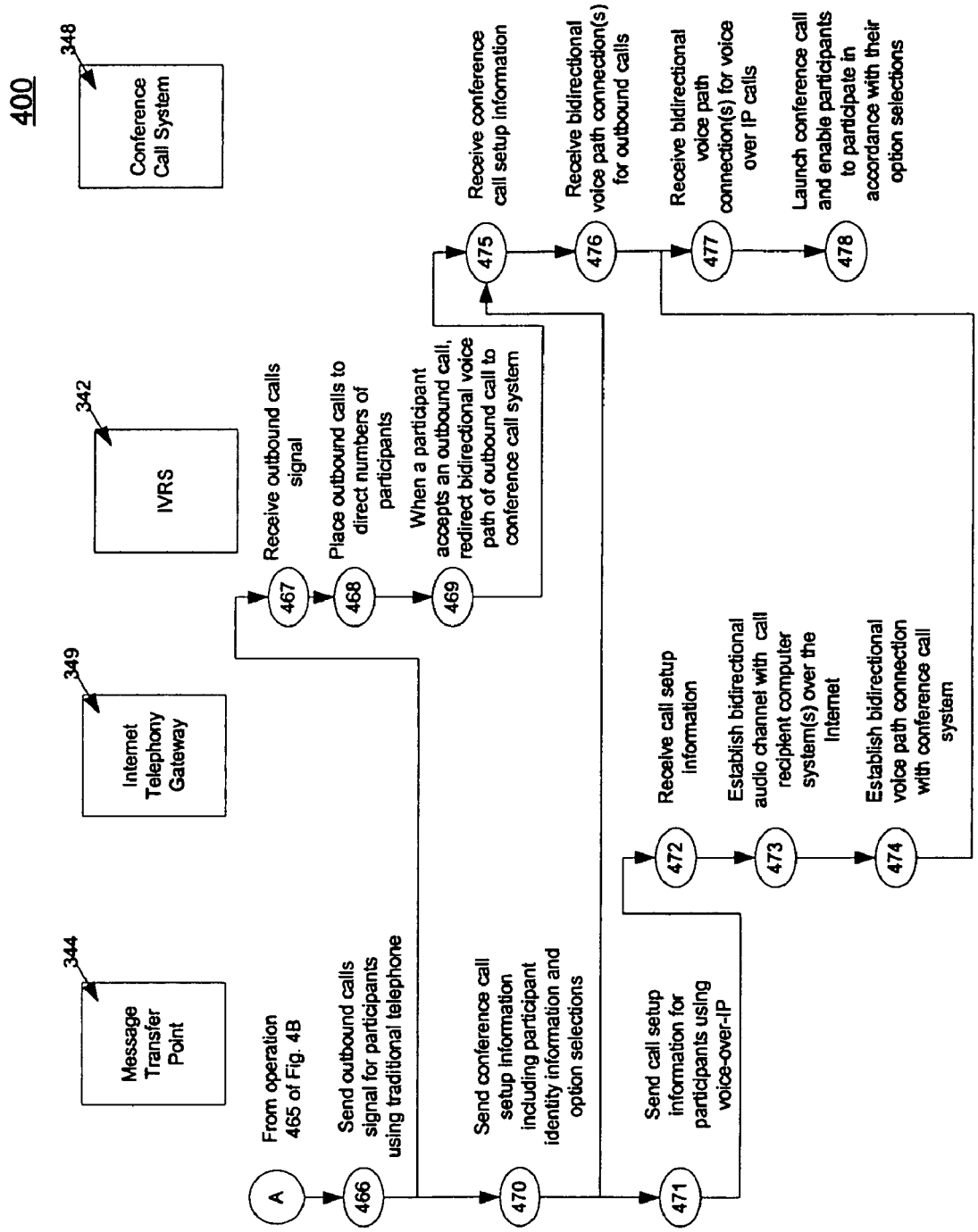

FIGS. 4A to 4C show a process 400 for initiating a conference call using an electronic messaging interface. For convenience, particular components described with respect to FIG. 3 are referenced as performing the process 400. However, similar methodologies may be applied in other implementations where different components are used to define the structure of the system, or where the functionality is distributed differently among the components shown by FIG. 3.

The user of the caller telephone 110 calls the IVRS 342 (402). The IVRS 342 accepts the call, validates the caller by, for example, prompting the caller for a caller identity and a password, and receives call-related information from the PSTN 330 (404). Once the caller is validated, the IVRS 342 sends a request to the message transfer point 344 for community configuration data associated with the caller (406). The request includes call-related information sufficient to enable the message transfer point 344 to determine the user identity of the caller (e.g., the message transfer point 344 may determine the user identity of the caller based on the telephone number of the caller).

The message transfer point 344 receives the request for communication configuration data (408) and accesses the configuration data store 346 to retrieve the community configuration data from the community configuration data record associated with the user identity of the caller (410). The message transfer point 344 sends the community configuration data to the IVRS 342 (412).

The IVRS 342 receives the community configuration data associated with the caller (414) and prompts the caller to input a conference call topic and conference call duration and prompts the caller to select a community of interest from those included in the community configuration data (416). The IVRS 342, for example, may prompt the caller to select a community of interest using an audio menu-driven interface. Each community of interest may be designated by an audio label or audio description provided by the caller during service registration, and the IVRS 342 speaks the list of audio labels and prompts the caller to select from among the various communities of interest by, for example, pressing a key in the touch pad of the caller telephone 310 or speaking a number associated with the selected community of interest. The IVRS 342 sends the caller selection to the message transfer point 344 (418).

In another implementation, the message transfer point 344 sends the community configuration data to the caller telephone 310 over the Internet 350. The caller telephone 310 may display the available communities of interest in a visual display as a list and enable the caller to select a community of interest from the list. The caller telephone 310 then sends the selection across the Internet 350 to the message transfer point 344. This implementation assumes that the caller telephone 310 has data communication capabilities to receive and send data over the Internet 350.

The message transfer point 344 receives the caller community of interest selection (420) and accesses the configuration data store 346 to identify the user identities included in the selected community of interest (422). The message transfer point 344 may identify the user identities by accessing the community data record corresponding to that community of interest. The message transfer point 344 sends a request to the presence detection server 362 for the online status of the user identities in the community of interest (424).

The presence detection server 362 receives the request for the online status of the user identities (426) and accesses the online status of the user identities in the community of interest (428). The presence detection server 362 sends the online status of the user identities to the message transfer point 344 (430).

The message transfer point receives the online status of the user identities (432) and determines whether at least one user identity is online. If no user identities are online, process 400 proceeds to operation 462. If at least one user identity is online, the message transfer point 344 accesses the configuration data store 346 to retrieve the call notification message format information stored in the account records associated with each online user identity (434). The message transfer point 344 generates call notification messages for each user identity that is online in accordance with the retrieved call notification message formats and sends the call notification messages to the alerts system 364 (436).

The alerts system 364 receives the call notification messages (438) and sends the call notification messages along with format data to call recipient computer systems 365, 370 corresponding to the online user identities (440). The receiving of the call notification messages and sending of the call notification messages and format data may be performed in real time.

Each call recipient computer system 365, 370 receives the call notification message and format data (442) and enables a user to perceive the call notification message (444). In one implementation, the call recipient computer system 365, 370 enables the user to perceive the call notification message as a pop-up window or dialog box that appears on a visual display of the call recipient computer system 365, 370.

The call recipient computer system 365, 370 enables the user to select an option offered in the call notification message prior to expiration of a predetermined time interval (e.g., 2 minutes) (445). The call recipient computer system 365, 370 sends the option selection to the alerts system 364 (446).

The alerts system 364 receives the option selection (447) and sends the option selection to the message transfer point 344 (448). The alerts system 364 may be configured to receive and send the option selection to the message transfer point 344 in real time.

The message transfer point 344 receives the option selection (449) and generates an updated call notification message for each user identity that is online and sends the updated call notification messages to the alerts system 364 (450). The alerts system 364 receives the updated call notification messages (451) and sends the updated call notification message to the corresponding call recipient computer systems 365, 370 (452). Each call recipient computer system 365, 370 receives an updated call notification message (453) and enables a user to perceive the updated call notification message (454).

After the message transfer point 344 receives option selections from all call recipient computer systems 365, 370 or after a predetermined interval of time (e.g., 2 minutes), the message transfer point 344 identifies the participants to the conference call based on the received option selections (455). The message transfer point 344 determines whether only one participant wishes to join the call (456). If the conference call connection options associated with that call recipient indicate that the call recipient wishes to use the call recipient telephone 315, 320 to connect to the conference call over the PSTN 330, the message transfer point 344 sends a forward call signal to the IVRS 346 (457). The IVRS 346 receives the forward call signal (458), sends a call forward instruction to the PSTN 330 over a signal channel (459), and plays an audio message informing the caller that only one participant wishes to join and the call is being forwarded to that participant (460). The PSTN 330 forwards the call to the appropriate call recipient telephone 315, 320 in accordance with the forward call signal received from the IVRS 346.

If the conference call connection options associated with the one call recipient that wishes to participate in the call indicate that the call recipient wishes to use the call recipient computer system 365, 370 to connect to the conference call over the Internet 350, the message transfer point 344 sends appropriate call setup information to the Internet telephony gateway 349. The Internet telephony gateway 349 then enables the recipient computer system 365, 370 of the call recipient to communicate with the conference call system 348 over a bi-directional audio channel (not shown).

The message transfer point 344 determines whether more than one potential call recipient wishes to participate in the conference call (461). If no potential call recipients wish to join the conference call, the message transfer point 344 sends a no participants signal to the IVRS 342 (462). The IVRS 342 receives the no participants signal (463) and plays an audio indicating to the caller that no participants are available to join the conference call (464). The IVRS 342 then instructs the PSTN 330 to disconnect the call (464).

If more than one potential call recipient wishes to join the conference call, the message transfer point 344 accesses the configuration data store to identify contact information associated with each participant (465). If one or more participants have chosen to connect to the conference call over the PSTN 330, the message transfer point 344 sends an outbound calls signal to the IVRS 342 (466). The outbound calls signal includes the telephone numbers of those participants that have chosen to connect to the conference call over the PSTN 330. The IVRS 342 receives the outbound calls signal (467) and places outbound calls to the telephone numbers of the corresponding participants over the PSTN 330 (468). When a participant accepts an outbound call, the IVRS 342 redirects the bi-directional voice path of the outbound call to the conference call system 348 (469).

The message transfer point 344 also sends conference call setup information to the conference call system 348 (470). If one or more participants have chosen to connect to the conference call over the Internet 350 using, for example, voice-over-IP, the message transfer point 344 sends call setup information to the Internet telephony gateway 349 for each of the participants that selected to connect to the conference call over the Internet 350 (471). The call setup information varies depending on the communications protocol used by the Internet telephony gateway 349 but typically includes the IP addresses of the recipient computer systems 365, 370 associated with the respective participants. The call setup information also typically includes the telephone numbers and/or trunk group identifiers assigned to the respective participants. The Internet telephony gateway 349 receives the call setup information (472) and establishes a bi-directional audio channel with the recipient computer systems 365, 370 (473). The Internet telephony gateway 349 also establishes a bi-directional voice path with the conference call system 348 for the corresponding recipient computer system 365, 370 (474). The gateway 349 enables audio communication between a recipient computer system 365, 370 and the conference call system 348 by receiving voice data packets from the recipient computer system 365, 370 over the bi-directional audio channel, decoding the voice data packets, converting the voice data packets to audio, and sending the audio to the conference call system 348 over the voice path assigned to that call recipient computer system 365, 370.

The conference call system 348 receives conference call setup information from the message transfer point 344 (475). The conference call system also receives bi-directional voice path connections for the outbound calls placed by the IVRS 342 (476) and for the Internet telephony calls placed by the Internet telephony gateway 349 (477). Once all participants have been connected to the conference call system 348 over a voice path, the conference call system 348 launches a conference call that enables participants to participate in accordance with their option selections (478).

In another implementation, the message transfer point 344 does not wait to receive option selections from all online identities before setting up the conference call. Rather, the message transfer point 344, the Internet telephony gateway 349, and the IVRS 342 perform operations 465-478 as soon as one or two participants agree to join the call. Additional participants may then join the conference call in progress by selecting the option to join the conference call in the updated call notification message. The updated call notification message may indicate to the remaining potential call recipients that the conference call is in progress. In this implementation, the additional participants may be allowed to select to join the conference call at any time during its duration (i.e., they are not forced to select a participation option in the predetermined time interval). Alternatively, the additional participants may be allowed to join the conference call only for a predetermined interval of time while the conference call is in progress (e.g., one minute).

FIG. 5A shows a user interface 500 that may be presented to the user by the call recipient computer system 165, 170, 365, 370 upon receipt of a call notification message. The user interface 500 includes a statements 510, 515, 516, and 517 informing the user of the conference call invitation, the topic of the conference call (e.g., "Review Parodi project progress"), the expected duration of the conference call (e.g., "30 minutes"), and the community of interest invited to join the conference call (e.g., "The Ultrasound Hardware Group"), respectively. The user interface 500 also includes caller-related information 520. The caller-related information 520 may include the name of the caller 522 (e.g., Bob Devane), the direct number of the caller telephone 524 (e.g., (703) 123-4567), the time and date when the call was received 526 (e.g., 5:45 EDT on May 17, 2002), and/or other caller-related information 528 that may be determined based on the direct number of the caller telephone 310. The other caller-related information 528 may include, for example, a caller-approved identifier (e.g., a replacement for the caller's name if the caller does not wish to disclose his or her name), the geographic location of the caller (e.g., Dulles, Va.) and information stored in an address book or calendar that is accessible based on the direct number of the caller telephone 110 (e.g., Meeting scheduled with Bob on Saturday Jul. 12, 2003). Such information may be stored locally at the call recipient computer system 165, 170, 365, 370 or may be accessible from a remote device across the data network 150 or the Internet 350.

The user interface 500 also includes participation option buttons 530 and checkboxes 540 that may be selected by the user to react to the call. The participation option buttons 530 may include, for example, an option button to join the conference call as an active participant 532, an option button to join the conference call as a listener 534, and an option button to not join the conference call 536. The checkboxes 540 may include, for example, a checkbox 542 to send a message to the other potential participants of the conference call, a checkbox 544 to join the conference call over the telephone network 130 or the PSTN 330, and a checkbox 546 to join the conference call over the data network 150 or the Internet 350.

Selecting the option button to join the call as an active participant 532 results in the user joining the call and being able to both listen and speak to the other participants. Selecting the option button to join the conference call as a listener 534 results in the user joining the call and being able to listen but not speak to the other participants. Selecting the option button to not join the conference call 536 results in the user rejecting the invitation to join the conference call.

Figure 5B:
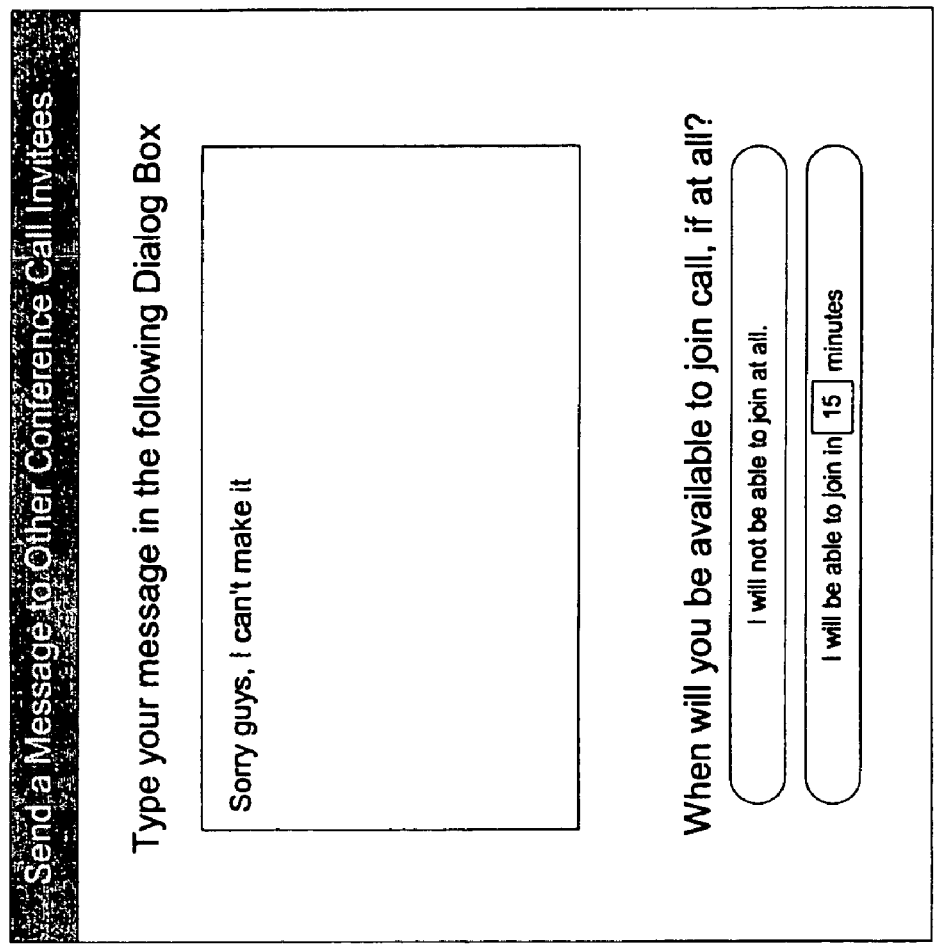

The user may choose to send a message to the other potential conference call participants by selecting (i.e. "checking") checkbox 542. If the user selects checkbox 542, upon the user selecting one of the participation option buttons 530, the user is prompted to input (or speak) a message or to select a predetermined message from a list of messages. The message is sent as part of the option selection to the ICCP 140, 340. In another implementation, the user interface 500 does not include checkbox 542 and the user is only prompted to input a message if the user selects to not participate in the conference call. The user may be prompted to input why he or she is unavailable to join the conference call and when he or she would be available to join such a call. FIG. 5B shows an exemplary user interface 550 that may be presented to the user to prompt the user to input why he or she is unavailable to join the conference call.

The user may choose to connect to the conference call over the telephone network 130 or over the PSTN 330 by selecting checkbox 544. The user may choose to connect to the conference call over the data network 150 or over the Internet 350 by selecting checkbox 546.

In another implementation, some or all of the call participation or call connection options selectable using the user interface 550 may not be available. Instead, some or all of the call participation and/or call connection option selections may be predetermined based on a set of default option selections previously setup for the user and chosen by or for the user. The default option selections may be stored in the subscriber account records and may vary based on the caller identity.

The user interface 500 may vary depending on the capabilities of the call recipient computer systems 165, 170, 365, 370 and the format data received from the online service provider system 160, 360. As mentioned before, call recipient computer systems 165, 170, 365, 370 with more limited capabilities may provide less caller-related information 510 and less call participation options 530 and checkboxes 540 while call recipient computer systems 165, 170, 365, 370 with greater capabilities may provide more caller-related information 510 and more options 530 and checkboxes 540.

FIG. 6 shows a user interface 600 that may be presented to the user by the call recipient computer system 165, 170, 365, 370 upon receipt of an updated call notification message. The user interface 600 includes a conference call status window 610. The conference call status window 610 includes a list 620 of data entries. Each data entry corresponds to a potential participant in the community of interest. The list 620 is divided into an invitee column 630, a status column 640, and a message column 650. A representative data entry 660 is shown.

The invitee column 630 displays the user identities of the potential participants. The status column 640 includes the participation status of the potential participants. The participation status may be designated, for example, as "active" to indicate an active participant, "inactive" to indicate a potential participant who will not be joining the conference call, "listener" to indicate a participant that will listen to the conference call but not otherwise participate in the conference call, and "?" to indicate a potential participant that has yet to select a participation option in response to a call notification message. The message column 650 includes messages sent by the potential participants to be viewed by all potential participants. The messages typically relate to the conference call or the message sender's participation in the conference call. The representative data entry 660 shows that the user identity "devoPar" has chosen to actively participate in the conference call and has sent to the other potential participants the message "John is with me and will join the call."

In another implementation, the information disclosed in the conference call status window 610 may be incorporated into the user interface 500 in a separate portion of the user interface 500 designated as, for example, "Conference Call Status." In yet another implementation, the conference call status window 610 only shows a total number of invitees for each status category (e.g., 3 active, 2 listener, 1 inactive, and 5 ?) and only shows a data entry 660 for those potential participants that send a message to the other potential participants.

A number of implementations have been described. Nevertheless, it will be understood that various modifications may be made. For example, the systems and processes refer to a voice path and a signaling channel with respect to the telephone network 130. In some implementations, the voice path and the signaling channel are separated (i.e., out-of-band signaling). In other implementations, the voice path and the signaling channel are integrated into one channel (i.e., in-band signaling) that handles the transmission of audio data as well as the transmission of call handling data.

Figure 7:
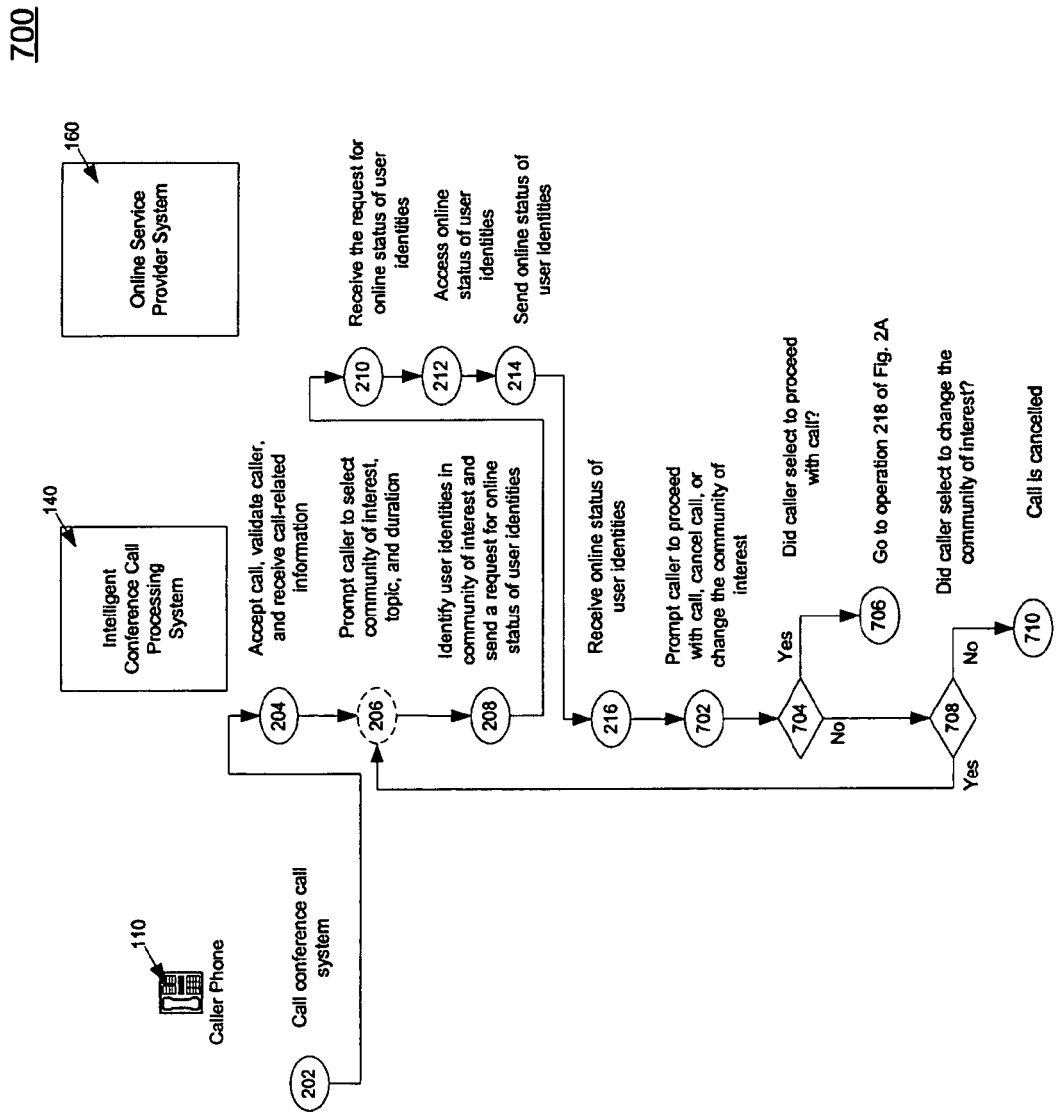
FIG. 7 is a flow chart illustrating a process for initiating a conference call using an electronic messaging interface.
Figure 8:
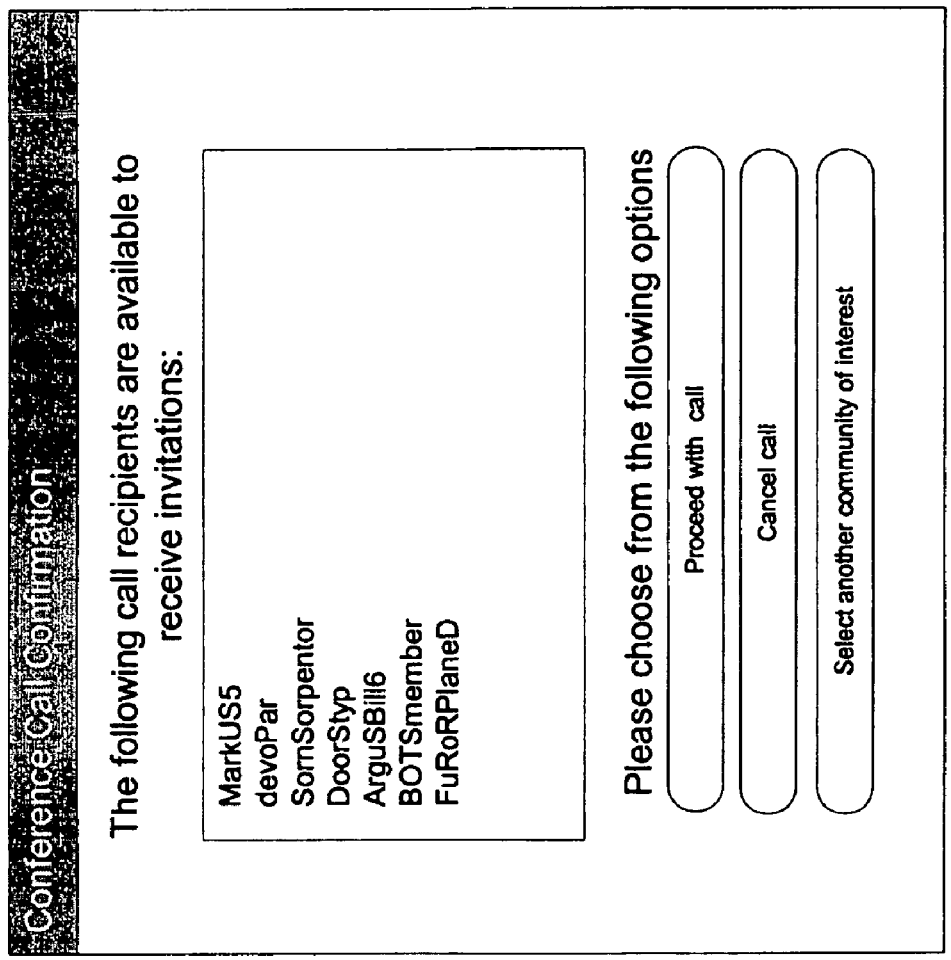
FIG. 8 illustrates an example of a user interface presented to a user that initiates a conference call.

Prior to sending call notification messages, the ICCPS 140, 340 may send a message to the caller telephone 110 that informs the caller of the online status of the call recipients in the community of interest that was identified by the caller. The ICCPS 140, 340 may give the caller the option to proceed with the conference call, cancel the conference call, or select another community of interest. If the caller selects to proceed with the conference call, then the ICCPS 140, 340 may send out call notification messages as discussed above. FIG. 7 shows a process 700 that includes the operations of the process 200 but with the additional operations 702-710 that enable the above-described functions. FIG. 8 shows a user interface 800 that informs the caller of the online status of the call recipients in the community of interest and prompts the caller to select from among a set of option buttons to proceed with the conference call, cancel the conference call, or select another community of interest.

In another implementation, the ICCPS 140, 340 may request the online status of user identities associated with the communities of interest from which the caller may select prior to prompting the caller to select or identify a community of interest. The pool of potential communities of interest or call recipients from which the caller may select may be reduced based on the determined online status of the identities associated with the communities of interest. For example, if no user identities in a give community of interest are online, then the caller is not allowed to select that community of interest.

Instead of making outbound calls (operation 258 in process 200 and operations 466-469 of process 400), the ICCPS 140, 340 may send connection telephone numbers (and pass code identities) to the call recipient computer systems 165, 170 associated with the call recipients that choose to participate in the call. The call recipient computer systems 165, 170 may display the connection telephone numbers (and pass code identity), and the call recipients may use the connection telephone numbers to call into the ICCPS 140, 340 and to join the conference call (by inputting the pass code identity). Sending connection telephone numbers (and pass code identities) may replace placing outbound calls for one or more of the call recipients.

Figure 9:
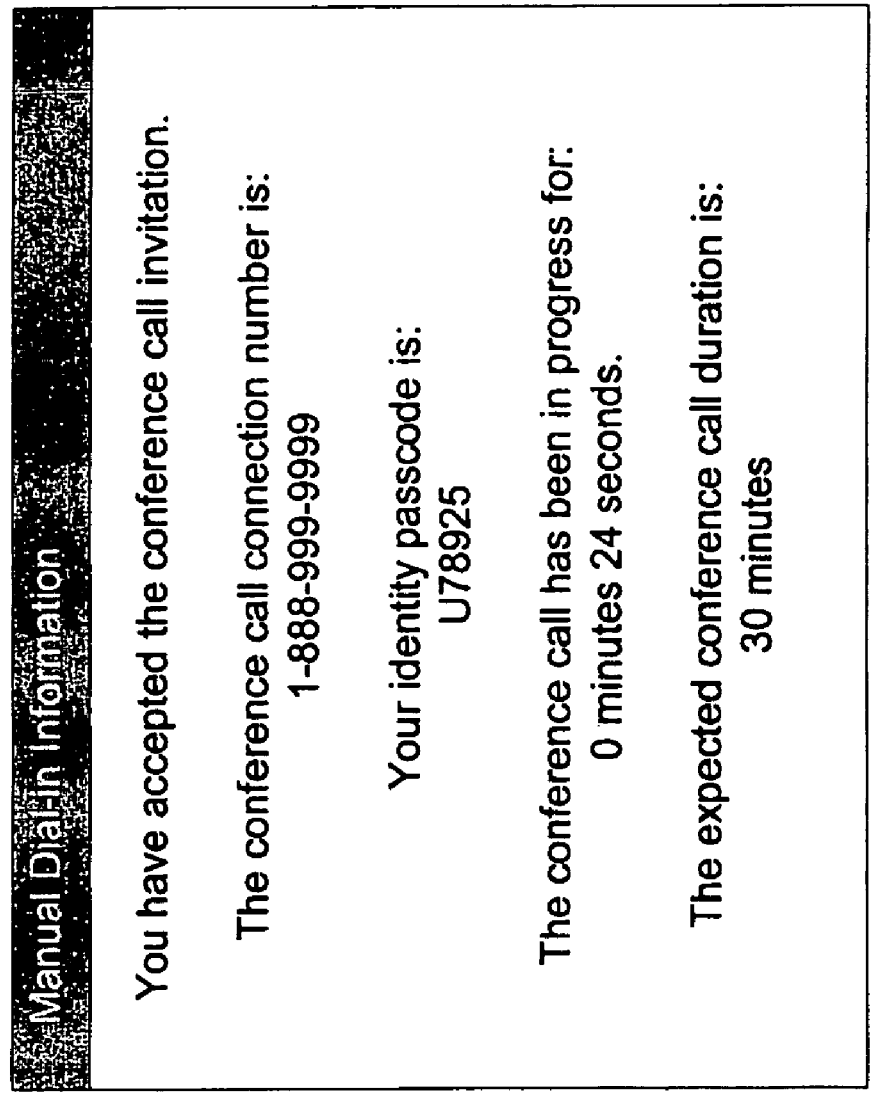
FIG. 9 illustrates an example of a user interface presented to a user upon the user accepting a conference call invitation.

FIG. 9 shows a user interface 900 that provides the call recipient with a connection telephone number and a pass code identity usable by the call recipient to participate in the conference call. User interface 900 also may inform the call recipient of the amount of time that the conference call has been in progress and the expected duration of the conference call. Alternatively, the ICCPS 140, 340 may send connection telephone numbers (and pass code identities) regardless of whether the call recipient has chosen to participate in the call. The call recipient may use the connection telephone number to call the ICCPS 140, 340 and thereby accept the call via the act of calling in.

Figure 10:
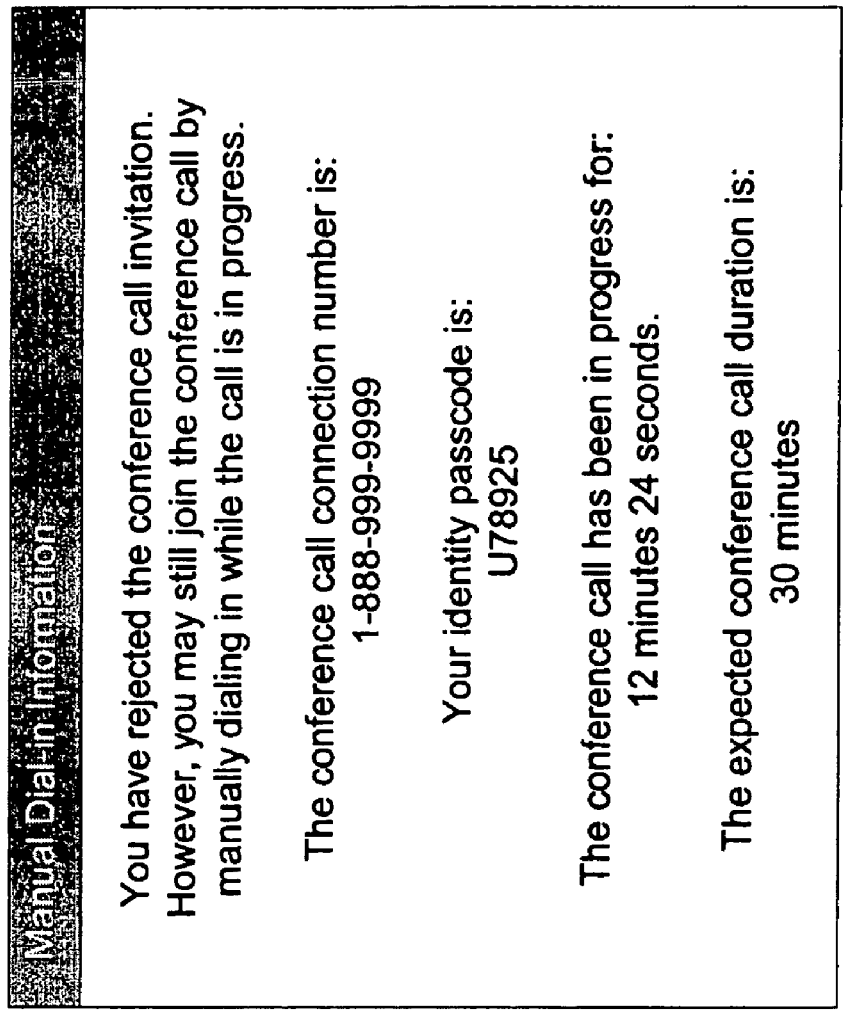
FIG. 10 illustrates an example of a user interface presented to a user upon the user rejecting a conference call invitation.

FIG. 10 shows a user interface 1000 similar to the user interface 900 but directed to a call recipient that has chosen not to participate in the conference call.

Figure 11:
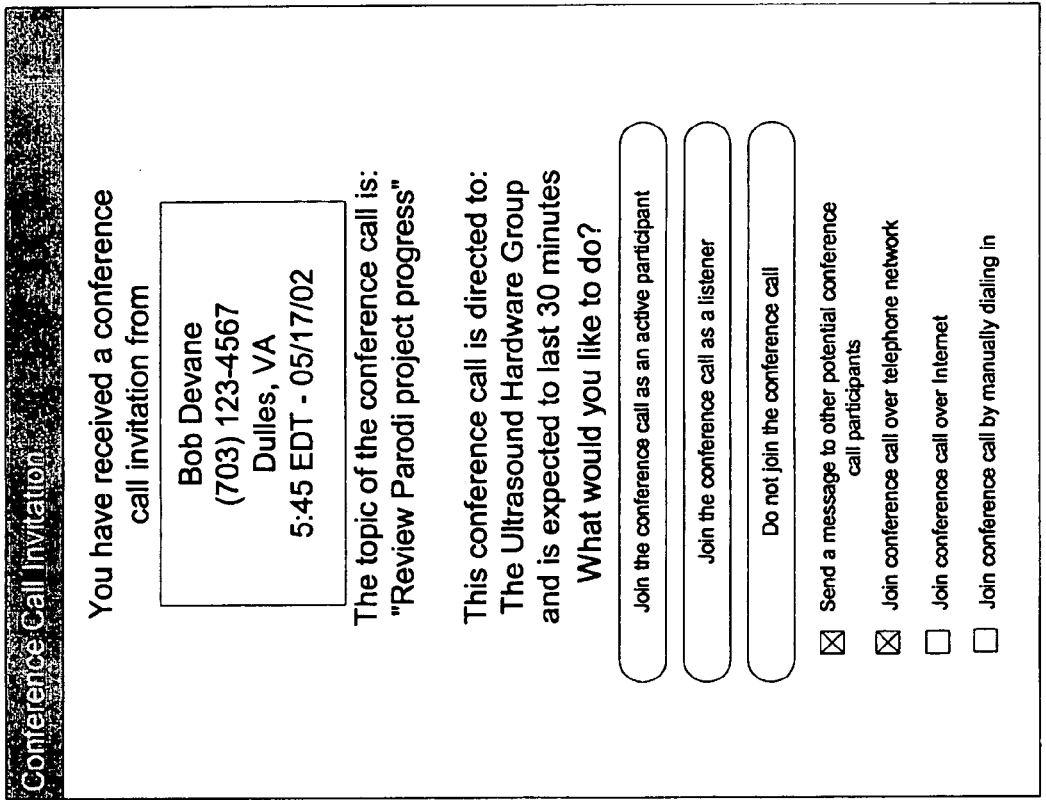
FIG. 11 illustrates an example of a user interface presented to a user upon receipt of a call notification message.

In yet another implementation, the conference call connection options may include an option to access the conference call by dialing into the conference call manually. Upon selecting this option, a connection telephone number is displayed that may be used by the call recipient to dial into the ICCPS 140, 340. FIG. 11 shows a user interface 1100 that is similar to the user interface 500 but with an additional call connection option to join the conference call by manually dialing in.

The conference call participation options may include an option to record the conference call. Selecting the option to record the conference call results in the message transfer point 344 instructing the IVRS 342 to establish a unidirectional voice path with the conference call system 348. The IVRS 342 receives the audio of the conference call through the unidirectional voice path and records the conference call as an audio file. The IVRS 342 sends the audio file to the message transfer point 344. The message transfer point 344 accesses the e-mail address of the potential call recipient that selected to record the conference call. The e-mail address of the potential call recipient may be stored as additional contact information in the community data records. The message transfer point 344 may access the e-mail address by, for example, accessing the community data records stored in the configuration data store 346. The message transfer point 344 may then send the audio file containing the conference call recording as an attachment to an e-mail sent to the corresponding e-mail address. The message transfer point 344 also may send an updated call notification message to all of the participants to inform them that the conference call is or will be recorded.

In another implementation, when a potential call recipient selects the option to take the conference call, the potential call recipient may be prompted to input a telephone number to which the outbound call will be placed by the ICCPS 140, 340. The potential call recipient may then join the conference call by answering the outbound call placed to that specified telephone number.

In yet another implementation, the potential call recipients may select and submit audio messages that are queued up by the IVRS 342 and played to the participants at the start of the conference call. The audio message may be predetermined and stored in an audio file at the call recipient computer system 365, 370. Additionally or alternatively, the audio message may be spoken by the potential call recipient and recorded in an audio file by the call recipient computer system 365, 370. The audio file may then be sent to the message transfer point 344 as part of the option selection of the potential call recipient. Additionally or alternatively, the option selection may include a pointer to the audio file which is stored in a data store communicatively coupled to the message transfer point 344. The message transfer point 344 receives or otherwise accesses the audio file and sends it or makes it available to the IVRS 344. The IVRS 344 queues up any audio files received from message transfer point 344 and establishes a unidirectional voice path with the conference call system 348. Once the conference call is initiated, the IVRS 344 may inform the participants of the number of audio messages sent by the potential call recipients and may then convert each audio file to audio and play sequentially or otherwise the audio to the participants of the conference call.

In another implementation, the caller telephone 110, 310 may be a data telephone and may call the ICCPS 140, 340 over the data network 150 or over the Internet 350. The telephony gateway in the ICCPS 140 may encode and decode voice data packets as necessary to enable the ICCPS 140, 340 to provide the same functionality as described above.

The call notification user interface and the call recipient computer systems 165, 170 may allow a call recipient to send text messages irrespective of whether the call recipient has selected a call participation option. In this implementation, the text message is unbundled from the conference call option selection of the call recipient and enables the call recipient to exchange communications (e.g., chat) with other call recipients prior to or subsequent to selecting to participate in the call. The communication exchange may be in a separate standalone window (e.g., a chat window) or may be presented to the other call recipients by the updated call notification message (e.g., in the status section of a call notification window or in the conference call participant status window). This communication by text messages may be implemented in a manner similar to that used for establishing chat rooms or for establishing multi-user Instant Messaging sessions. For example, the text messages sent by the call recipients may be shown in the message column 650 and may be dynamically updated as new text messages are sent. In contrast, the entries in the status column 640 change only when the call recipient has selected a call participation option. FIG. 12 shows a user interface 1200 similar to the user interface 600 but with an additional stand-alone chat window.

Figure 13:
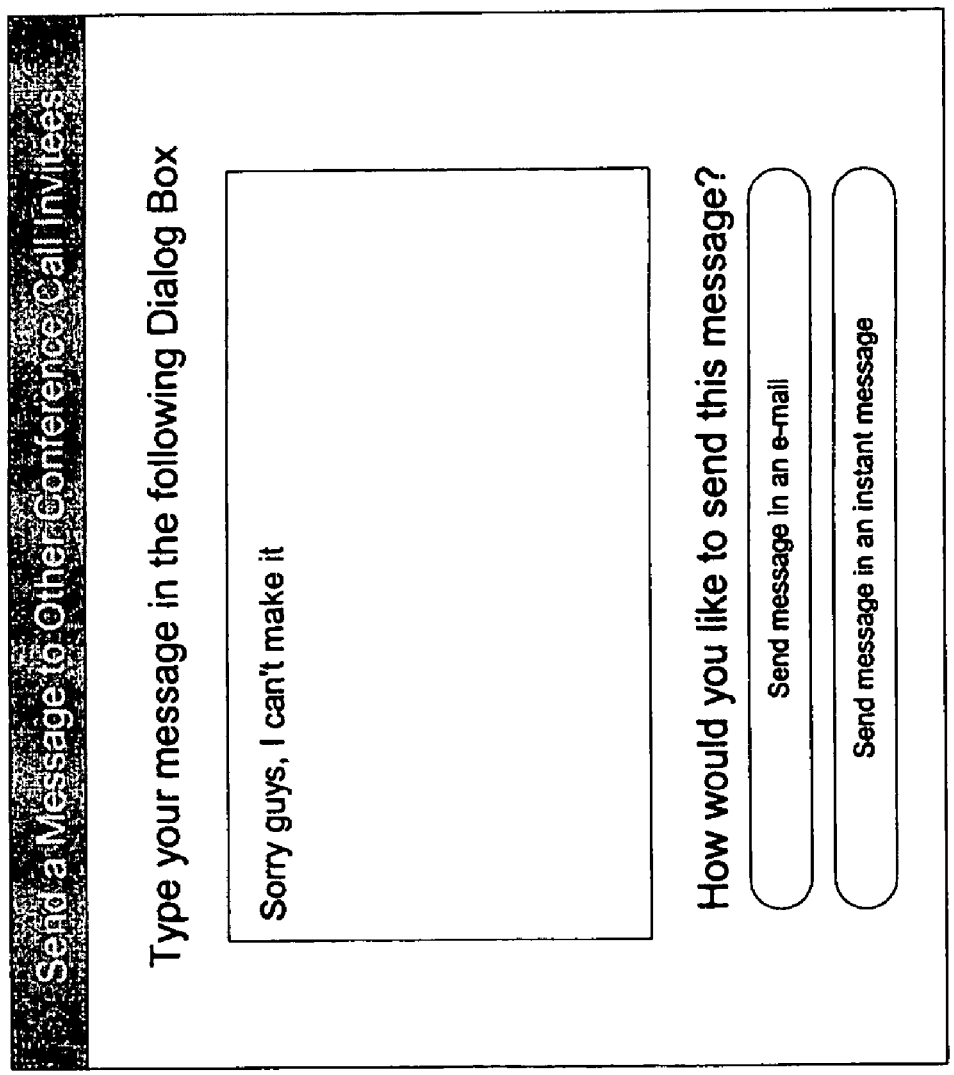
FIG. 13 illustrates an example of a user interface presented to a user that enable the user to send a message to other conference call invitees.

Alternatively, the text messages may be sent to the caller and/or to one or more of the other call recipients as e-mails or as instant messages. For example, when a call recipient selects to not participate in a conference call, the call notification user interface and the call recipient computer systems 165, 170 may enable the recipient to send an instant message or an e-mail to the caller and/or to the other call recipients. The e-mail or instant message may explain why the call recipient is not able to participate in the conference call and optionally when the call recipient will be available. FIG. 13 shows a user interface 1300 similar to the user interface 550 but with the options to send the message as an e-mail or as an instant message.

Figure 14:
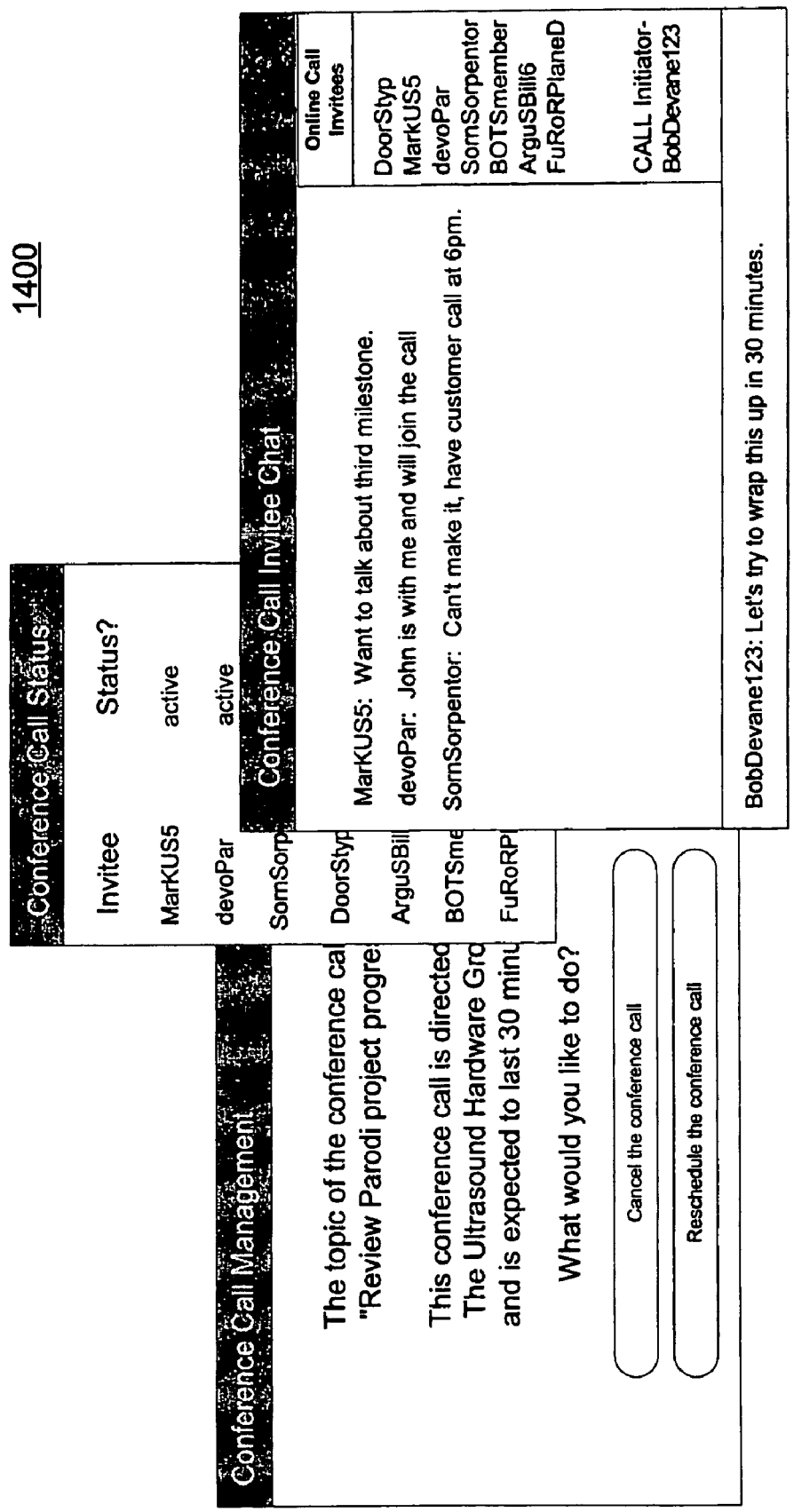
FIG. 14 illustrates an example of a user interface presented to a user that initiates a conference call.

An updated call notification message also may be sent to a caller computer system (not shown). The caller computer system may be a stand-alone system or may be integrated with the caller telephone 110 as a single computer system. Upon receiving the updated call notification message, the caller computer system may enable the caller to perceive a conference call participant status window. FIG. 14 shows a user interface 1400 that enables the caller to cancel or reschedule the conference call and to view the conference call participant status. The user interface 1400 also enables the caller to send text messages to the other call recipients. For example, the caller may use the interface 1400 to send a text message to the call recipients to inform them that the conference call is going to be rescheduled due to, for example, the unavailability of certain call recipients and then may select the option in the user interface 1400 to cancel the conference call. The user interface 1400 allows this exchange of text messages via a chat window.

Accordingly, other implementations are within the scope of the following claims.

What is claimed is:

1. A method for initiating a conference call, the method comprising:
   identifying a group of users;
   determining the availability of users within the identified group to receive an electronic conference call invitation;
   sending an electronic conference call invitation to at least two users within the identified group based on their determined availability;
   enabling the users who are sent the electronic conference call invitation to respond to the electronic conference call invitation;
   determining whether users who are sent the electronic conference call invitation respond with an indication of availability for participation in the conference call; and
   initiating a conference call between users who are sent the electronic conference call invitation based on whether the users respond with an indication of availability.

2. The method of claim 1, wherein identifying a group of users includes identifying a group of users based on a telephone call received from a caller and wherein initiating a conference call between users comprises initiating a conference call between the users and the caller.

3. The method of claim 2, wherein identifying a group of users based on the call includes identifying the group of users based on the telephone number called by the caller.

4. The method of claim 1, wherein identifying a group of users includes identifying the group of users by enabling an initiating user to specify the group of users.

5. The method of claim 4, wherein enabling the initiating user to specify the group of users includes enabling the initiating user to choose a group of users from a plurality of predetermined groups.

6. The method of claim 5, wherein the plurality of predetermined groups is personalized to the initiating user.

7. The method of claim 1, wherein identifying a group of users includes identifying a group of users that share a common interest, trait, or characteristic.

8. The method of claim 1, wherein identifying a group of users includes receiving a telephone call from a caller and enabling the caller to specify the users in the group.

9. The method of claim 8, wherein identifying a group of users includes presenting identifiers for candidate users verbally to the caller and accepting identification of selected candidate users by the caller.

10. The method of claim 1, wherein identifying a group of users includes accepting identification of selected candidate users by an initiating user that selected the candidate users based on user attributes.

11. The method of claim 1, wherein determining the availability of the users to receive an electronic conference call invitation includes accessing the online status of user identifiers corresponding to each user from an online service provider system.

12. The method of claim 11, wherein the conference call is setup using voice-over-IP such that initiating the conference call comprises initiating a voice-over-IP conference call.

13. The method of claim 1, wherein sending an electronic conference call invitation to at least two users comprises sending a separate electronic conference call invitation to each of the at least two users.

14. The method of claim 13, wherein sending an electronic conference call invitation to each of the at least two users comprises sending electronic conference call invitations addressed to user identifiers corresponding to the at least two users to an online service provider system for delivery to the at least two users.

15. The method of claim 14, wherein the electronic conference call invitations comprise e-mails.

16. The method of claim 14, wherein the electronic conference call invitations comprise instant messages.

17. The method of claim 1, wherein enabling the users to respond to the electronic conference call invitation includes enabling the users to select from among one or more options personalized to each user.

18. The method of claim 1, wherein enabling the users to respond to the electronic conference call invitation includes enabling the users to select from among one or more call participation options.

19. The method of claim 18, wherein the call participation options include an option selectable to actively participate in the conference call.

20. The method of claim 18, wherein the call participation options include an option selectable to allow the user to listen but not speak when participating in the conference call.

21. The method of claim 18, wherein the call participation options include an option selectable to not participate in the conference call.

22. The method of claim 18, wherein the call participation options include an option to send a message to each of the other users that received an electronic conference call invitation.

23. The method of claim 22, wherein the message comprises a text message.

24. The method of claim 22, wherein the message comprises an audio message.

25. The method of claim 18, wherein the call participation options include an option selectable to record the conference call.

26. The method of claim 25, wherein the option to record the call is selectable to record the conference call and to send the recording to the user using e-mail.

27. The method of claim 18, further comprising enabling each of the users who are sent the electronic conference call invitation to perceive the call participation options selected by the other users who are sent the electronic conference call invitation.

28. The method of claim 27, wherein enabling each of the users who are sent the electronic conference call invitation to perceive the call participation options selected by the other users comprises enabling each of the users who are sent the electronic conference call invitation to perceive the call participation options selected by the other users in a visual display.

29. The method of claim 18, further comprising enabling a user that initiates the conference call to perceive the call participation options selected by the users who are sent the electronic conference call invitation.

30. The method of claim 29, further comprising enabling the user that initiates the conference call to cancel the conference call based on the perceived call participation options selected by the users who are sent the electronic conference call invitation.

31. The method of claim 1, wherein enabling the users to respond to the electronic conference call invitation includes enabling the users to select from among one or more call connection options.

32. The method of claim 31, wherein the call connection options include an option to connect to the conference call over a telephone network.

33. The method of claim 31, wherein the call connection options include an option to connect to the conference call over a data network.

34. The method of claim 31, wherein the call connection options include an option selectable to display a telephone number that may be used to dial into the conference call.

35. The method of claim 1, further comprising determining the availability of users to receive an electronic conference call invitation prior to identifying the group of users and wherein identifying the group of users comprises identifying a group of users from among the users determined to be available.

36. The method of claim 1, wherein determining the availability of users within the identified group comprises determining the availability of the users to participate in the conference call using voice-over-IP.

37. A computer system for initiating a conference call, the system comprising:
a call processing element configured to:
identify a group of users;
determine the availability of users within the identified group to receive an electronic conference call invitation;
send an electronic conference call invitation to at least two users within the identified group based on a determination of their availability;
enable the users who are sent the electronic conference call invitation to respond to the electronic conference call invitation; and
determine whether users who are sent the electronic conference call invitation respond with an indication of availability for participation in the conference call; and
a conference call system interface configured to enable a conference call to be initiated between the users who are sent the electronic conference call invitation based on whether the users respond with an indication of availability.

38. The computer system of claim 37, wherein the call processing element is configured to identify a group of users based on a phone call received from a caller.

39. The computer system of claim 38, further comprising a telephony interface element configured to receive the call from the caller.

40. An apparatus for initiating a conference call, the apparatus comprising:
means for identifying a group of users;
means for determining the availability of users within the identified group to receive an electronic conference call invitation;
means for sending an electronic conference call invitation to at least two users within the identified group based on a determination of their availability;
means for enabling the users who are sent the electronic conference call invitation to respond to the electronic conference call invitation;
means for determining whether users who are sent the electronic conference call invitation respond with an indication of availability for participation in the conference call; and
means for initiating a conference call between the users who are sent the electronic conference call invitation based on whether the users respond with an indication of availability.

41. A user interface for enabling a user to perceive and respond to a conference call invitation, the user interface comprising:
a first interface element structured and arranged to provide notification that an electronic conference call invitation has been received from a sender; and
a second interface element structured and arranged to enable a recipient of the invitation to respond to the electronic conference call invitation by enabling the recipient to select from among one or more options to react to the received invitation.

42. The user interface of claim 41, wherein the first interface element includes a perceivable indicator reflecting sender profile information.

43. The user interface of claim 42, wherein the sender profile information comprises the name of the sender, a telephone number associated with the sender, or the geographic location of the sender.

44. The user interface of claim 41, wherein the first interface element includes a perceivable indicator reflecting a topic of discussion for the conference call.

45. The user interface of claim 41, wherein the first interface element includes a perceivable label associated with the group of users to which conference call invitations have been sent.

46. The user interface of claim 41, wherein the first interface element includes a perceivable indicator reflecting an identity of one or more other users to whom the electronic conference call invitation has been extended.

47. The user interface of claim 41, wherein the first interface element includes a perceivable indicator reflecting an identity of all other users to whom the electronic conference call invitation has been extended.

48. The user interface of claim 41, wherein the options are personalized to the recipient.

49. The user interface of claim 48, wherein the options made available to a first recipient are different than the options made available to a second recipient.

50. The user interface of claim 41, wherein the options include call participation options.

51. The user interface of claim 50, wherein the call participation options include an option selectable to actively participate in the conference call involving the sender.

52. The user interface of claim 50, wherein the call participation options include an option selectable to allow the user to listen but not speak when participating in the conference call involving the sender.

53. The user interface of claim 50, wherein the call participation options include an option selectable to not participate in the conference call.

54. The user interface of claim 53, wherein the option selectable to not participate in the conference call comprises an option selectable to decline the conference call invitation.

55. The user interface of claim 53, wherein the option selectable to not participate in the conference call comprises an option selectable to communicate electronically with the sender using a medium other than the conference call.

56. The user interface of claim 55, wherein the option to communicate with the sender comprises an option to send an e-mail to the sender.

57. The user interface of claim 55, wherein the option to communicate with the sender comprises an option to send an instant message to the sender.

58. The user interface of claim 50, wherein the call participation options include an option to send a message to each of the other users that received an electronic conference call invitation from the sender.

59. The user interface of claim 58, wherein the message comprises a text message.

60. The user interface of claim 58, wherein the message comprises an audio message.

61. The user interface system of claim 50, wherein the call participation options include an option selectable to record the conference call.

62. The user interface of claim 61, wherein the option to record the call is selectable to record the conference call and to send the recording to the user using e-mail.

63. The user interface of claim 41, further comprising a third interface element structured and arranged to enable the recipient to perceive the call participation option selected by the other users that received an electronic conference call invitation from the sender.

64. The user interface of claim 41, wherein the options includes call connection options.

65. The user interface of claim 64, wherein the call connection options include an option to connect to the conference call over a telephone network.

66. The user interface of claim 64, wherein the call connection options include an option to connect to the conference call over a data network.

* * * * *